United States Patent
Bai et al.

(10) Patent No.: US 8,634,635 B2
(45) Date of Patent: Jan. 21, 2014

(54) SYSTEM AND METHOD FOR STEREO-VIEW MULTIPLE ANIMAL BEHAVIOR CHARACTERIZATION

(75) Inventors: Xuesheng Bai, Ashburn, VA (US); Vikrant N. Kobla, Ashburn, VA (US); FaYin Li, Fairfax, VA (US); Dongliang Liu, Rockville, MD (US); Yiqing Liang, Vienna, VA (US)

(73) Assignee: Clever Sys, Inc., Reston, VA (US)

( * ) Notice: Subject to any disclaimer, the term of this patent is extended or adjusted under 35 U.S.C. 154(b) by 987 days.

(21) Appl. No.: 12/261,691

(22) Filed: Oct. 30, 2008

(65) Prior Publication Data
US 2010/0111359 A1 May 6, 2010

(51) Int. Cl.
*G06K 9/00* (2006.01)

(52) U.S. Cl.
USPC .......................................................... 382/154

(58) Field of Classification Search
None
See application file for complete search history.

(56) References Cited

U.S. PATENT DOCUMENTS

| | | | |
|---|---|---|---|
| 3,100,473 A | 8/1963 | Kissel | |
| 3,304,911 A | 2/1967 | Hakata et al. | |
| 3,485,213 A | 12/1969 | Scanlon | |
| 3,803,571 A | 4/1974 | Luz | |
| 3,974,798 A | 8/1976 | Meetze, Jr. | |
| 4,337,726 A | 7/1982 | CzekaJewski et al. | |
| 4,517,593 A * | 5/1985 | Keller et al. | 348/139 |
| 4,574,734 A | 3/1986 | Mandalaywala et al. | |
| 4,600,016 A | 7/1986 | Boyd et al. | |
| 4,631,676 A | 12/1986 | Pugh | |
| 4,888,703 A | 12/1989 | Baba et al. | |
| 5,299,454 A | 4/1994 | Fuglewicz et al. | |
| 5,428,723 A | 6/1995 | Ainscow et al. | |
| 5,546,439 A | 8/1996 | Hsieh | |
| 5,581,276 A | 12/1996 | Cipolla et al. | |
| 5,596,994 A | 1/1997 | Bro | |
| 5,708,767 A | 1/1998 | Yeo et al. | |
| 5,748,775 A | 5/1998 | Tsuchikawa et al. | |
| 5,816,256 A | 10/1998 | Kissinger et al. | |
| 5,821,945 A | 10/1998 | Yeo et al. | |
| 5,870,138 A | 2/1999 | Smith et al. | |
| 6,010,465 A | 1/2000 | Nashner | |
| 6,061,088 A | 5/2000 | Khosravi et al. | |
| 6,072,496 A | 6/2000 | Guenter et al. | |

(Continued)

FOREIGN PATENT DOCUMENTS

| | | | |
|---|---|---|---|
| EP | 363755 A2 | 4/1990 | |
| EP | 0 933 726 A2 | 8/1999 | |

(Continued)

OTHER PUBLICATIONS

Johnson, Paula D., "Practical Aspects of Experimental Design in Animal Reseach". ILAR Journal vol. 43, No. 4. 2002 [Retrieved from Internet Feb. 14, 2012].*

(Continued)

*Primary Examiner* — Atiba O Fitzpatrick
*Assistant Examiner* — Thomas A James
(74) *Attorney, Agent, or Firm* — Alston & Bird LLP

(57) ABSTRACT

In general, the present invention is directed to systems and methods for identifying behaviors of two or more animal using video. The invention includes a system with at least two video cameras coupled to a computer where the computer is configured to automatically perform animal segmentation and identification, animal body parts identification, and behavior identification.

60 Claims, 18 Drawing Sheets

(56) References Cited

U.S. PATENT DOCUMENTS

| | | | |
|---|---|---|---|
| 6,072,903 | A | 6/2000 | Maki et al. |
| 6,081,607 | A | 6/2000 | Mori et al. |
| 6,088,468 | A | 7/2000 | Ito et al. |
| 6,144,366 | A | 11/2000 | Numazaki et al. |
| 6,212,510 | B1 | 4/2001 | Brand |
| 6,231,527 | B1 | 5/2001 | Sol |
| 6,242,456 | B1 | 6/2001 | Shuster et al. |
| 6,263,088 | B1 | 7/2001 | Crabtree et al. |
| 6,295,367 | B1 | 9/2001 | Crabtree et al. |
| 6,311,644 | B1 | 11/2001 | Pugh |
| 6,334,187 | B1* | 12/2001 | Kadono ............... 713/176 |
| 6,456,737 | B1* | 9/2002 | Woodfill et al. ......... 382/154 |
| 6,468,998 | B1 | 10/2002 | Kuroita et al. |
| 6,535,131 | B1 | 3/2003 | Bar-Shalom et al. |
| 6,576,237 | B1 | 6/2003 | Ingham et al. |
| 6,601,010 | B1 | 7/2003 | Fowler et al. |
| 6,630,148 | B1 | 10/2003 | Ingham et al. |
| 6,630,347 | B1 | 10/2003 | Huang et al. |
| 6,650,778 | B1 | 11/2003 | Matsugu et al. |
| 6,678,413 | B1 | 1/2004 | Liang et al. |
| 6,704,502 | B2 | 3/2004 | Morofuji |
| 6,715,444 | B1 | 4/2004 | Yabusaki et al. |
| 6,757,444 | B2 | 6/2004 | Matsugu et al. |
| 6,819,796 | B2 | 11/2004 | Hong et al. |
| 6,837,184 | B2 | 1/2005 | Gondhalekar et al. |
| 6,899,686 | B2 | 5/2005 | Hampton et al. |
| 6,941,239 | B2 | 9/2005 | Unuma et al. |
| 7,133,537 | B1 | 11/2006 | Reid |
| 7,269,516 | B2* | 9/2007 | Brunner et al. ............ 702/19 |
| 7,567,702 | B2* | 7/2009 | Woodfill et al. ......... 382/154 |
| 2003/0024482 | A1 | 2/2003 | Gondhalekar et al. |
| 2003/0100998 | A2 | 5/2003 | Brunner et al. |
| 2004/0009845 | A1 | 1/2004 | Johnson |
| 2004/0020443 | A1 | 2/2004 | Ohl |
| 2004/0141635 | A1* | 7/2004 | Liang et al. ............ 382/110 |
| 2004/0141636 | A1 | 7/2004 | Liang et al. |
| 2006/0088203 | A1* | 4/2006 | Boca et al. ............ 382/153 |
| 2007/0003130 | A1* | 1/2007 | Goerick et al. ......... 382/153 |
| 2007/0229522 | A1* | 10/2007 | Wang et al. ........... 345/547 |
| 2008/0152192 | A1* | 6/2008 | Zhu et al. ............. 382/103 |

FOREIGN PATENT DOCUMENTS

| | | |
|---|---|---|
| JP | 63-133061 | 6/1988 |
| JP | 08-063603 | 3/1996 |
| JP | 08-240830 | 9/1996 |
| JP | 09-073541 | 3/1997 |
| JP | 09-251441 | 9/1997 |
| JP | 11-052215 | 2/1999 |
| JP | 11-259643 | 9/1999 |
| JP | 11-296651 | 10/1999 |
| JP | 2000-215319 | 8/2000 |
| WO | WO/02/43352 | 5/2002 |

OTHER PUBLICATIONS

Zhou, X.M., "Image retrieval based on objects orientation spatial relationship" Pattern recognition Letters 22 (2001) 469-477.*

AccuScan on-line catalog, Nov. 19, 1997.

Allen, William H. "Animals and their Models do their Locomotions: Biologists Probe Mechanics and Energetics of Animal Motion". Jun. 1995. Biosciences. vol. 45, No. 6, pp. 381-383.

Automated Plus Maze Open/Closed Arm System; AccuScan Instruments, Inc., 1991.

Birch et al. 2001. "A miniature Hybrid Robot Propelled by Legs". Proceedings of the 2001 IEE/RSJ International Conference on Intelligent Robots and Systems, p. 845-851.

Brand M. et al. "Discovery and segmentation of Activities in Video," IEEE Transactions on Pattern Analysis and Machine Intelligence, IEEE Service Center, Los Alamitos, CA US, vol. 22, No. 8, pp. 844-851, (Aug. 1, 2000).

Clarke, K.A. and J. Still "Development and consistency of gait in the mouse" Physiology & Behavior 73:159-164 (2001).

Clarke, K.A. and J. Still "Gait Analysis in the Mouse" Physiology & Behavior 66(5):723-729 (1999).

Cohen, J.J. et al.; "Behavior, Stress, and Lymphocyte Recirculation"; Stress, Immunity and Aging; 1984; pp. 73-80.

Coussons-Read, Mary E. et al.; "Behavioral Assessment of the Ts65Dn Mouse, A Model for Down Syndrome: Altered Behavior in the Elevated Plus Maze and Open Field"; Behavior Genetics; vol., 26; No. 1; 1996; pp. 7-13.

Crnic et al. "Automated Analysis of Digitized Videotapes of Mouse Home-Cage Behavior," Program No. 573.7 2000Neuroscience Meeting Planner, New Orleans, LA Society of Neuroscience, (Nov. 7, 2000).

Crnic, L.S. et al.; "Animal Models of Mental Retardation: An Overview"; Mental Retardation and Developmental Disabilities Research Reviews; vol. 2; 1996; pp. 185-187.

Crnic, L.S. et al.; "Animal Modes of Human Behavior: Their Application to the Study of Attachment"; The Development of Attachment and Affiliative Systems: Neurobiological and Psychobiological Aspects, Plenum, New York; 1982; pp. 31-42.

Crnic, L.S. et al.; "Behavioral Effects of Mouse Interferons-$\alpha$ and -$\gamma$ and Human Interferon-.alpha. In Mice"; Brain Research; vol. 590; 1992; pp. 277-284.

Crnic, L.S. et al.; "Behavioral Effects of Neonatal Herpes Simplex Type 1 Infection of Mice"; Neurotoxicology and Teratology; vol. 10; 1988; pp. 381-386.

Crnic, L.S. et al.; "Down Syndrome: Neuropsychology and Animal Models"; Progress in Infancy Research; vol. 1; 2000; pp. 69-111.

Crnic, L.S. et al.; "Prostaglandins Do Not Mediate Interferon-.alpha. Effects on Mouse Behavior"; Physiology & Behavior; vol. 51; 1992; pp. 349-352.

Crnic, L.S. et al.; "Separation-Induced Early Malnutrition: Maternal, Physiological and Behavioral Effects"; Physiology & Behavior; vol. 26; 1981; pp. 695-706.

Crnic, L.S.; "Animal Models of Early Malnutrition: A Comment on Bias, Dependability, and Human Importance"; Malnutrition and Behavior: Critical Assessment of Key Issues; 1984; pp. 460-468.

Crnic, L.S.; "Behavioral Consequences of Virus Infection"; Psychoneuroimmunology, Second Edition; Academic Press; 1991; pp. 749-769.

Crnic, L.S.; "Early Experience Effects: Evidence for Continuity?"; Continuities and Discontinuities in Development, Plenum Press, New York; 1984; pp. 355-368.

Crnic, L.S.; "Effects of Infantile Undernutrition on Adult Learning in Rats: Methodological and Design Problems"; Psychological Bullentin; vol. 83; No. 4; 1976; pp. 715-728.

Crnic, L.S.; "Effects of Infantile Undernutrition on Adult Sucrose Solution Consumption in the Rat"; Physiology & Behavior; vol. 22; 1979; pp. 1025-1028.

Crnic, L.S.; "Effects of Nutrition and Environment on Brain Biochemistry and Behavior"; Developmental Psychobiology; vol. 16; 1983; pp. 129-145.

Crnic, L.S.; "Maternal Behavior in the Undernourished Rate (*Rattus norvegicus*)"; Physiology & Behavior; vol. 16; 1976; pp. 677-680.

Crnic, L.S.; "Models of Infantile Malnutrition in Rats: Effects on Maternal Behavior"; Developmental Psychobiology; vol. 13; 1980; pp. 615-628.

Crnic, L.S.; "Nutrition and Mental Development"; American Journal of Mental Deficiency; vol. 88; No. 5; 1984 pp. 526-533.

Crnic, L.S.; "The Effects of Chronic Lithium Chloride Administration on Complex Schedule Performance, Activity, and Water Intake in the Albino Rat"; Physiological Psychology; vol. 4; 1976; pp. 166-170.

Crnic, L.S.; "The Use of Animal Models to Study Effects of Nutrition on Behavior"; Diet and Behavior: A Multidisciplinary Approach; Springer-Verlag; 1990; pp. 73-87.

Crnic, L.S.; "Transgenic and Null Mutant Animals for Psychosomatic Research"; Psychosomatic Medicine; vol. 58; 1996; pp. 622-632.

Crnic, Linda S. et al., "Automated Analysis of Digitized Videotapes of Mouse Home-Cage Behavior", Feb. 17, 2000.

Dierssen, Mara et al.; "Murine Models for Down Syndrome"; Physiology and Behavior; vol. 73; 2001; pp. 859-871.

Digiscan DMicro System; AccuScan Instruments, Inc., 1996.

(56) References Cited

OTHER PUBLICATIONS

Digiscan Model CCDIGI Optical Animal Activity Monitoring System, AccuScan Instruments, Inc., 1997.

Digiscan Optical Animal Activity Monitoring System, AccuScan Instruments, Inc., 1997.

Dorai, C. et al.; "Generating Motion Descriptors From MPEG-2 Compressed HDTV Video for Content-Based Annotation and Retrieval"; In Proceedings of IEEE Third Workshop on Multimedia Signal Processing (MMSP); Sep. 1999; (4pgs).

Dorai, C. et al; "Extracting Motion Annotations From MPEG-2 Compressed Video for HDTV Content Management Applications"; IEEE International Conference on Multimedia Computing and Systems; Jun. 1999; (6pgs).

Dunn, Andrea L. et al.; "Repeated Injections of Interferon α A/D in Balb/c Mice: Behavioral Effects"; Brain, Behavior, and Immunity; vol. 7; 1993; pp. 104-111.

EthoVision, computer vision system for automation of behavioral experiments, Noldus Information Technology, 1997.

Fitzgerald, R.E. et al., "Validation of a Photobeam System for Assessment of Motor Activity in Rats," Toxicology, 49 (1988) pp. 433-439.

Granholm, Ann-Charlotte et al.; "Loss of Cholinergic Phenotype in Basal Forebrain Coincides With Cognitive Decline in a Mouse Model of Down's Syndrome"; Experimental Neurology; vol. 161; 2000; pp. 647-663.

Gurney, Mark E. et al. "Motor Neuron Degeneration in Mice That Express a Human Cu,Zn Superoxide Dismutase Mutation" Science 264:1772-1775 (Jun. 17, 1994).

HVS Image Homepage Nov. 25, 1997; Video tracking system for Morris water maze, open field, radial-arm maze, etc.

Hyde, L.A. et al.; "Age-Related Deficits in Context Discrimination Learning in Ts65Dn Mice That Model Down Syndrome and Alzheimer's Disease"; Behavioral Neuroscience; vol. 115; 2001; pp. 1-8.

Hyde, L.A. et al.; "Motor Learning in Ts65Dn Mice, a Model for Down Syndrome"; Developmental Psychobiology; vol. 38; 2001; pp. 33-45.

Hyde, L.A. et al.; "Ts65Dn Mice, A Model for Down Syndrome, Have Deficits in Context Discrimination Learning Suggesting Impaired Hippocampal Function"; Behavioral Brain Research; vol. 118; 2001; pp. 53-60.

Jones, A.P. et al.; "Maternal Mediation of the Effects of Malnutrition"; The Handbook of Behavioral Teratology; Plenum; 1986; pp. 409-425.

Kobla, Vikrant et al.; "Archiving, Indexing, and Retrieval of Video in the Compressed Domain"; In Proceedings of SPIE Conference on Multimedia Storage and Archiving Systems; vol. 2916; Nov. 1996; (12pgs).

Kobla, Vikrant et al.; "Compressed Domain Video Indexing Techniques Using DCT and Motion Vector Information in MPEG Video"; In Proceedings of SPIE Conference on Storage and Retrieval for Image and Video Databases V; vol. 3022; Feb. 1997; (12pgs).

Kobla, Vikrant et al.; "Compressed Domain Video Segmentation"; CFAR Technical Report CS-TR-3688, University of Maryland, College Park; Oct. 25, 1996; (34pgs).

Kobla, Vikrant et al.; "Detection of Slow-Motion Replay Sequences for Identifying Sports Videos"; In Proceedings of IEEE Third Workshop on Multimedia Signal Processing (MMSP); Sep. 1999; (6pgs).

Kobla, Vikrant et al.; "Developing High-Level Representations of Video Clips Using Video Trails"; In Proceedings of SPIE Conference on Storage and Retrieval for Image and Video Databases VI; Jan. 1998; (12pgs).

Kobla, Vikrant et al.; "Extraction of Features for Indexing MPEG-Compressed Video"; In Proceedings of IEEE First Workshop on Multimedia Signal Processing (MMSP); Jun. 1997; (6pgs).

Kobla, Vikrant et al.; "Feature Normalization for Video Indexing and Retrieval"; CFAR Technical Report CS-TR-3732, University of Maryland, College Park; Nov. 1996; (40pgs).

Kobla, Vikrant et al.; "Identifying Sports Videos Using Replay, Text, and Camera Motion Features"; Proceedings of the SPIE Conference on Storage and Retrieval for Media Databases; vol. 3972; Jan. 2000; (12pgs).

Kobla, Vikrant et al.; "Indexing and Retrieval of MPEG Compressed Video"; Journal of Electronic Imaging; vol. 7(2); Apr. 1998; (36pgs).

Kobla, Vikrant et al.; "Special Effect Edit Detection Using Video Trials: A Comparison With Existing Techniquess"; Proceedings of SPIE Conference on Storage and Retrieval for Image and Video Databases VII; Jan. 1999; (12pgs).

Kobla, Vikrant et al.; "Video Trails: Representing and Visualizing Structure in Video Sequences", In Proceedings of ACM Multimedia Conference; Nov. 1997; (12pgs).

Kram, R., Wong, B. and Full, R.J. 1997. "Three-Dimensional Kinematics and Limb Kinetic Energy of Running Cockroaches". The Journal of Experimental Biology 200, 1919-1929.

Li, Yanbing et al; "Semantic Image Retrieval Through Human Subject Segmentation and Characterization"; In Storage and Retrieval for Image and Video Databases V, SPIE; vol. 3022; 1997; pp. 340-351.

Liang Yiqing et al.; "A Ground Target Detection System for Digital Video Database"; Conference on Visual Information Processing VII, AeroSense '98, Orlando, Florida; Apr. 1998; (6pgs).

Liang, Yiqing et al.; "A Practical Video Indexing and Retrieval System"; Applied Imagery and Pattern Recognition (AIPR) '97, Washington, D.C.; Oct. 1997; (8pgs).

Liang, Yiqing et al.; "Apprenticeship Learning of Domain Models"; Seventh Intl. Conference on Software Engineering and Knowledge Engineering, Rockville, Maryland; Jun. 1995; (9pgs).

Liang, Yiqing et al.; "Multiple Motion Detection Using Genetic Algorithms"; DARPA Image Understanding Workshop, Monterey, CA; Nov. 1998; (8pgs).

Liang, Yiqing et al.; "Toward an Object and Multiple-Modalities Based Indexing and Retrieval of Video Contents"; DARPA's Image Understanding Workshop; Monterey, California; Nov. 1998; (21pgs).

Liang, Yiqing et al; "A Practical Video Database Based on Language and Image Analysis"; AAAI Technical Report, SS-97-03 , , ed., Alex Hauptmann & Michael Witbrock, Intelligent Use and Integration of Text, Image, Video and Speech; Mar. 1997; (6pgs).

Liang, Yiqing et al; "A Shot Boundary Detection Algorithm Adapted for Predator Video"; Applied Imagery and Pattern Recognition (AIPR) '98; Washington, D.C.; Oct. 1998; (9pgs).

Liang, Yiqing Ph.D.; "Video Retrieval Based on Language and Image Analysis"; Defense Advanced Research Projects Agency Information Systems Office; May 28, 1999; 35 pgs.

Liang, Yiqing; "A Practical Digital Video Database Based on Language and Image Analysis"; International Conference Multimedia Databases on Internet; Seoul, Korea; Oct. 10, 1997; (23pgs).

Liang, Yiqing, "Digital Video Technologies and Their Applications," Beijing Dec. 2000, 24 pages.

Liu, Bede et al.; "The Princeton Video Library of Politics"; Digital Libraries '94, Texas A & M University; Jun. 1994; pp. 215-216.

Macmillan, D.L. "A Physiological Analysis of Walking in the American Lobster". Feb. 6, 1975. Biological Sciences (England) vol. 270.

Nielsen, D.M. et al.; "Elevated Plus Maze Behavior, Auditory Startle Response and Shock Sensitivity in Predisease and in Early Stage Autoimmune Disease MRL/Ipr Mice"; Brain Behavior and Immunity; 2001; pp. 1-16.

Omnitech Electronics, Inc., Olympus 1 Meter × 1 Meter Animal Activity Monitor, 1988.

Omnitech Electronics, Inc., Residential Maze Computerized System, 1991.

Ozer, I. Burak et al.; "A Graph Based Object Description for Information Retrieval in Digital Image and Video Libraries"; Proceedings of IEEE Workshop on Content-Based Access of Image & Video Libraries, Colorado; Jun. 1999; (5pgs).

Ozer, I. Burak et al.; "Human Activity Detection in MPEG Sequence"; Proceedings of IEEE Workshop on Human Motion Austin; Dec. 2000; pp. 61-66.

Ozer, I. Burak et al., "Human Detection in Compressed Domain." Proceedings of International Conference on Image Processing, Thessaloniki, Greece, Oct. 2001.

(56) References Cited

OTHER PUBLICATIONS

Ozer, I. Burak et al.; "Relational Graph Matching for Human Detection and Posture Recognition"; SPIE, Photonic East 2000, Internet Multimedia Management Systems, Boston; Nov. 2000; (12pgs).

Ozer, W. Wolf et al., "Video Analysis for Smart Rooms," Proc. SPIE vol. 4519, p. 84-90, Internet Multimedia Management Systems II, Jul. 2001.

Palmer, James D. et al., "Approaches to Domain Model Construction", Domain Modeling Workshop, 13.sup.th International Conference on Software Engineering, Austin, Texas; Mar. 26, 1991; pp. 130-135.

Palmer, James D. et al.; "Classification As an Approach to Requirements Analysis"; 1.sup.st ASIS SIG/CR Classification Research Workshop, Toronto, Canada; Nov. 4, 1990; pp. 129-136.

Philips, Michael et al.; "A Multi-Attribute Shot Segmentation Algorithm for Video Programs"; Proceedings, SPIE 2916; 1996; (10pgs).

Philips, Michael et al.; "Video Segmentation Techniques for News"; SPIE, vol. 2916; 1996; pp. 243-251.

Rota et al. "Video Sequence Interpretation for Visual Surveillance," Proceedings, IEEE Workshop on Visual Surveillance, vol. 3$^{rd}$, pp. 59-67, (Jul. 1, 2000).

RotoScan, Rotometer High Resolution Rotation Monitoring; AccuScan Instruments, Inc., 1993.

Sago, Haruhiko et al.; "Genetic Dissection of Region Associated With Behavioral Abnormalities in Mouse Models for Down Syndrome"; Pediatric Research; vol. 48; No. 5; 2000; pp. 606-613.

Sakic, Boris et al.; "Reduced Corticotropin-Releasing Factor and Enhanced Vasopressin Gene Expression in Brains of Mice With Autoimmunity-Induced Behavioral Dysfunction"; Journal of Neuroimmunology 96; 1999; pp. 80-91.

San Diego Instruments Behavioral Testing Systems, Nov. 19, 1997 (18 pages).

Schrott, Lisa M. et al., "Sensitivity to Foot Shock in Autoimmune NZB .times. NZW F1 Hybrid Mice"; Physiology & Behavior; vol. 56; No. 5; 1994; pp. 849-853.

Schrott, Lisa M. et al.; "Anxiety Behavior, Exploratory Behavior, and Activity in NZB .times. NZW F1 Hybrid Mice: Role of Genotype and Autoimmune Disease Progression"; Brain, Behavior and Immunity; vol. 10; 1996; pp. 260-274.

Schrott, Lisa M. et al.; "Increased Anxiety Behaviors in Autoimmune Mice"; Behavioral Neuoscience; vol. 110; No. 3; 1996; pp. 492-502.

Schrott, Lisa M. et al.; "The Role of Performance Factors in The Active Avoidance-Conditioning Deficit in Autoimmune Mice"; Behavioral Neuroscience; vol. 110; No. 3; 1996; pp. 486-491.

Schrott Lisa M. et al.; "Attenuation of Behavioral Abnormalities in Autoimmune Mice by Chronic Soluble Interferon-.gamma. Receptor Treatment"; Brain, Behavior and Immunity; vol. 12; 1998; pp. 90-106.

Segall, M.A. et al.; "A Test of Conditioned Taste Aversion With Mouse Interferon-.alpha."; Brain, Behavior and Immunity; vol. 4; 1990; pp. 223-231.

Segall, M.A. et al.; "An Animal Model for the Behavioral Effects of Interferon"; Behavioral Neuroscience; vol. 104; No. 4; 1990; pp. 612-618.

Stauffer et al. "Learning Patterns of Activity Using Real-Time Tracking," IEEE Transactions on Pattern Analysis and Machine Intelligence, IEEE Service Center, Los Alamitos, CA US, vol. 22, No. 8, pp. 747-757, (Aug. 1, 2000).

The Observer, Professional system for collection, analysis and management of observational data, Noldus Information Technology, 1996.

Tremorscan Monitor Model TS1001; AccuScan Instruments, Inc., 1997.

Wolf, W.; "Key Frame Selection by Motion Analysis"; Proceedings, ICASSP, IEEE Press; 1996; (4pgs).

Wolf, Wayne et al.; "A Digital Video Library for Classroom Use"; International Conference on Digital Library '95, Tsukuba; Aug. 1995; (6pgs).

Wolf, Wayne et al.; "A Digital Video Library on the World Wide Web"; ACM Multimedia '96, Addison-Wesley, Publishing Company; Nov. 1996; pp. 433-434.

Wolf, Wayne et al., "A Smart Camera for Real-Time Human Activity Recognition," 2001 IEEE Workshop on Signal Processing Systems, Antwerp, Belgium, Sep. 2001.

Wolf, Wayne; "Hidden Markov Model Parsing of Video Programs"; IEEE; 1997; pp. 2609-2611.

Yeo, B.L. et al.; "Theft-Resistant Video Browsing Using Filtered Versions of Compressed Sequences"; IEEE Conference on Multimedia Computing and Systems; 1995; (6pgs).

Yeung, Minerva M. et al.; "Video Browsing Using Clustering and Scene Transitions on Compressed Sequences"; SPIE Conference on Multimedia Computing and Networking; vol. 2417, 1995; pp. 399-413.

Yu, H. et al.; "A Visual Search System for Video and Image Databases"; IEEE Multimedia; 1997; (8pgs).

Yu, H. et al.; "Hierarchical, Multi-Resolution Algorithms for Dictionary-Driven Content-Based Image Retrieval"; International Conference on Image Processing; 1997; (4pgs).

Yu, H. et al.; "Scenic Classification Methods for Image and Video Databases"; SPIE; vol. 2606; 1995; pp. 363-371.

Yu, Hong-Heather et al.; "A Hierarchical Multiresolution Video Shot Transition Detection Scheme"; Computer Vision and Image Understanding; vol. 75; Jul./Aug. 1999; pp. 196-213.

Yu, Hong-Heather et al.; "Multi-Resolution Video Segmentation Using Wavelet Transformation"; In Storage and Retrieval for Image and Video Databases VI, SPIE; vol. 3312; 1998; pp. 176-187.

Yu, Hong-Heather et al; "A Multi-Resolution Video Segmentation Scheme for Wipe Transition Identification"; In Proceedings IEEE ICASSP; vol. 5; 1998; pp. 2965-2968.

Yu, Hong-Heather et al; "A Visual Search System for Video and Image Databases"; In Proceedings, ICMCS 1997, IEEE Computer Society Press; 1997; pp. 517-524.

Zeng, H. et al; "Data Mining for Combat Vehicle Classification Using Machine Learning"; Applied Imagery and Pattern Recognition (AIPR) '98, Washington, D.C.; Oct. 1998; (10pgs).

\* cited by examiner

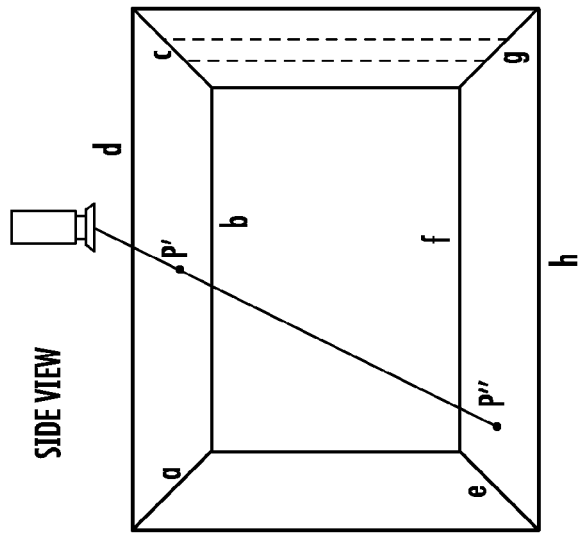
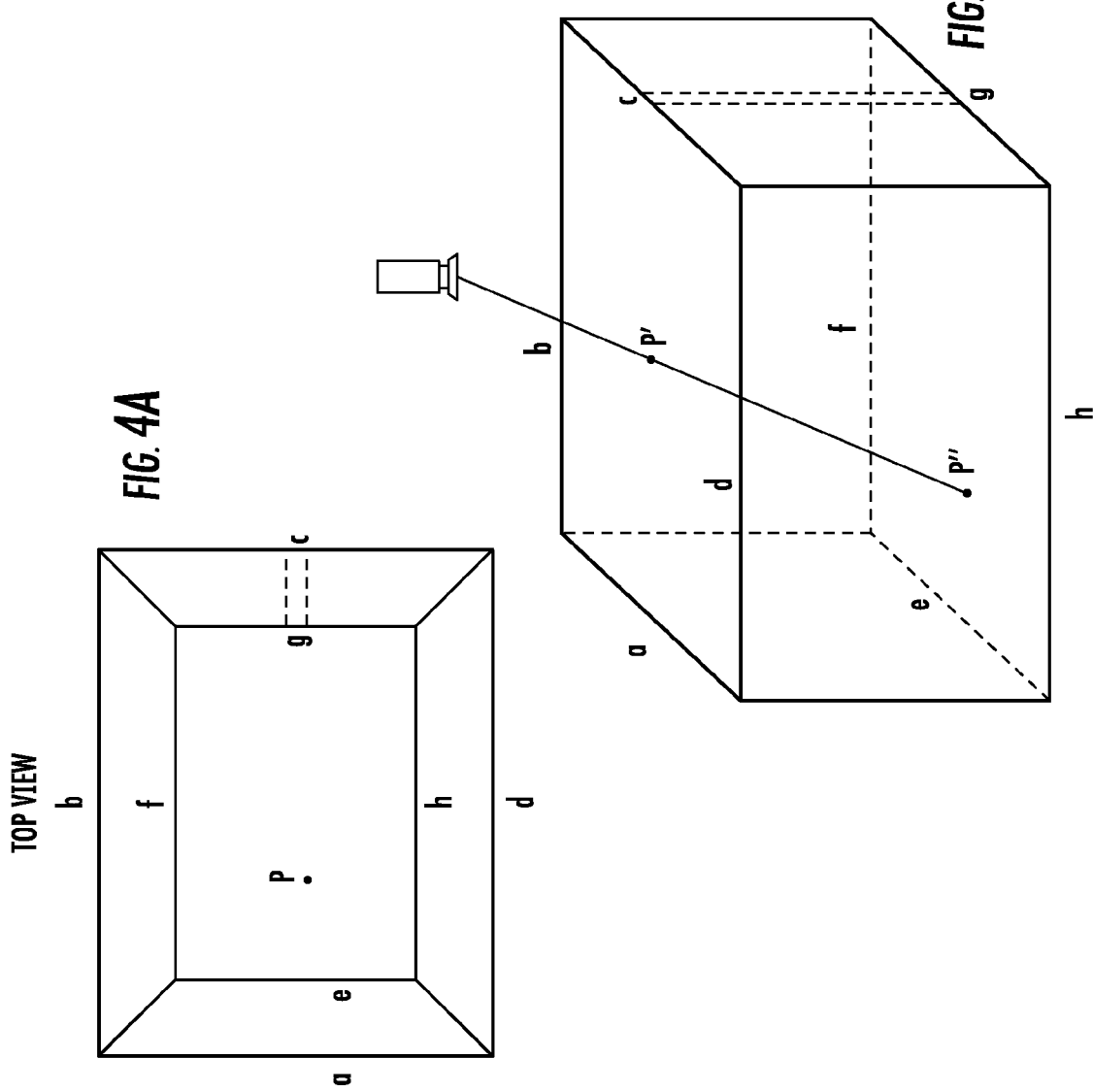

TOP VIEW

SIDE VIEW

TOP VIEW

SIDE VIEW

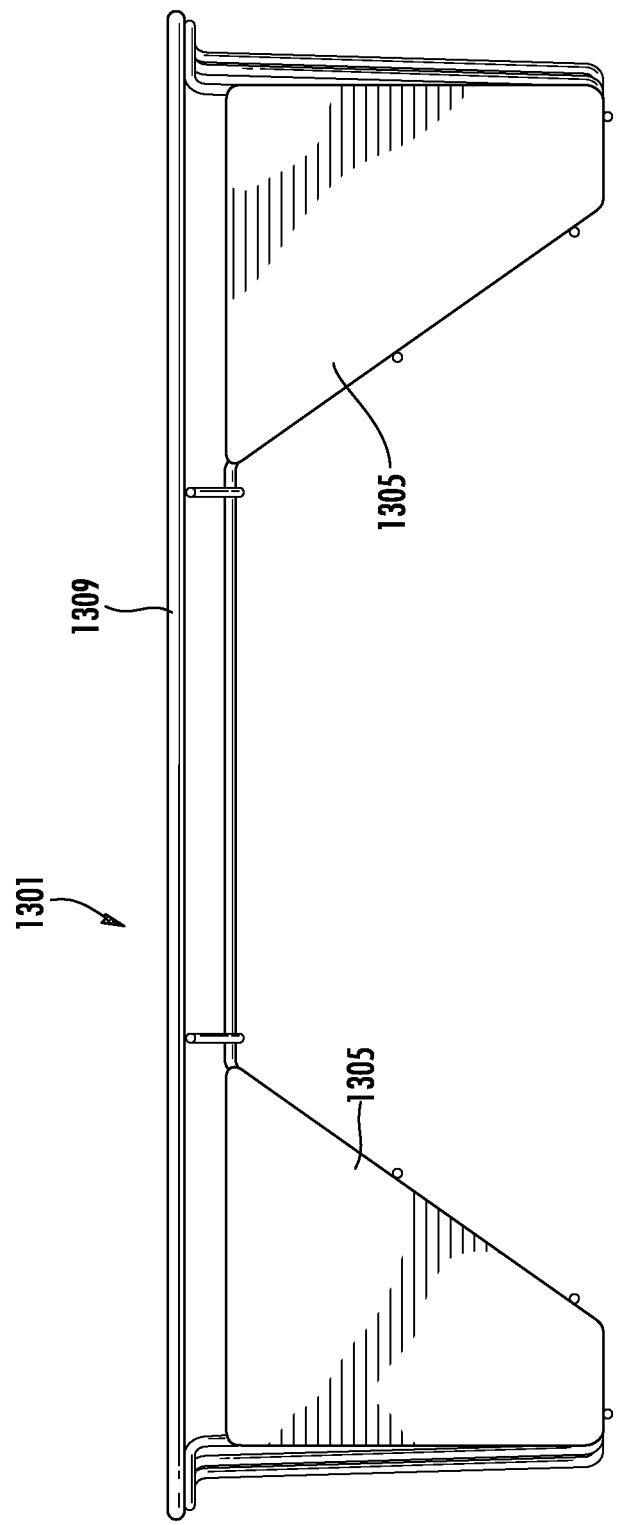

SYSTEM AND METHOD FOR STEREO-VIEW MULTIPLE ANIMAL BEHAVIOR CHARACTERIZATION

FIELD OF THE INVENTION

The field of the invention relates generally to identification and recognition of living organisms in a scene, including more particularly, the identification of the behavior of multiple living organisms in an image or video using video analysis.

BACKGROUND OF THE INVENTION

Living organisms, such as animals, in particular mice or rats, are used extensively as human models in the research of drug development; genetic functions; toxicology research; understanding and treatment of diseases; and other research applications. Despite the differing lifestyles of humans and animals their extensive genetic and neuron-anatomical homologies give rise to a wide variety of behavioral processes that are widely conserved between species. Exploration of these shared brain functions will shed light on fundamental elements of human behavioral regulation. Therefore, many behavioral experiments have been designed for mice and rats to explore their behaviors. This research includes, for example, experiments studying home cage behaviors of lab animals, freezing experiments for conditioned fear, self-administration in operant chamber, social interaction experiments in an open environment, open field locomotion experiments, object recognition experiments, a variety of maze experiments, water maze experiments, forced swimming and tail suspension for depression studies and others. The use of these and other types of experimental paradigms were previously described in literature, for instance in the U.S. Patent Application Publication No. 2004/0141635 to Liang, which is hereby incorporated by reference in its entirety.

Many of these experiments are best observed by recording animals in specified periods of time including several 24-hour periods and subsequently using two independent observers to score the recording. However, the drawbacks of such observations include the instability of long term human observation, the time consumed, and the huge costs associated with the observation.

Social behavior is the basis of one of the most generally accepted independent dimensions of personality and has many important roles in the survival of individuals and the species. Many clinical disorders associated with social behavior include difficulties in creating or maintaining social interactions, such as social anxiety disorder, several personality disorders, autism, etc. Social interaction tests are typically designed for evaluating behavior parameters of social communications, including analyses of pair-bonding, dominance hierarchies, social memory, social deficits, social phobias, social anxiety, joyful play, aggression and flight, maternal and sexual behaviors. Home cages, basic chambers or open field and other test environments are presently commonly used with two or more animals to perform social behavior experiments. As with the other types of behavior analysis, these experiments are usually conducted by recording the animals for a predetermined period of time in a particular environment followed by subsequent review by two independent observers. Among the social behaviors that are identified by the observers include pouncing, social grooming, crawling, pinning, sniffing, following, mounting, etc.

Typically these experiments use human observation of the recordings of the sessions. Given the tediousness of the work and the difficulty of being able to observe accurately the position and interaction of the animals by human observation, this type of analysis can result in inaccuracy and inherently includes subjective analysis. For example if the human observer is only looking at one view the activity may be hidden by the position of one of the animals. If the observer is looking at multiple views, it is very time consuming and difficult to view two or more views simultaneously. Given the fact that this method is labor-intensive, the analysis is costly.

Video analysis technology has been applied in behavior analysis in objects including animals and human in an effort to alleviate some of these problems. An automated lab animal home cage behavior is described in U.S. Patent Application Publication No. 2004/0141635 to Liang, which is hereby incorporated by reference in its entirety. The SocialScanTop product from Clever Sys Inc utilizes one top view camera to analyze social interactions of multiple animals. However, this product and others using a single camera fail to meet the demand by scientists in the field.

Thus, there exists a need for systems and software that can address the problems of measurement and analysis in the experiments mentioned above, provide analysis of meaningful complex behaviors to meet the post-genomic era's demands, and obtain consistent results.

SUMMARY OF THE INVENTION

The inventions disclosed and described herein include novel approaches, apparatus and algorithms for analyzing behaviors of multiple living organisms in an arena, such as in group-housed animals' scenario. Aspects of the inventions can be found in the exemplary stereo-view multiple animal behavior analysis system described herein.

One aspect of the inventions includes defining a unique set of behaviors for each type of living organism under investigation. Computer systems of the disclosed inventions can produce digital files of animal behaviors in real time or in off-line mode and utilize algorithms to automatically ascribe certain behaviors to the living organisms under investigation.

A novel and unified framework is provided in one aspect for automatically identifying behaviors from multiple behavioral paradigms using images obtained from multiple viewpoints. This unified framework lays the foundation and provides common layer for automated behavior identification and analysis in various experimental paradigms that include, but are not limited to, home cage behaviors, seizures, water maze, mazes, locomotion, object recognition, freezing for fear conditioning, forced swimming, tail suspension, drug effect, gait analysis, and social interactions, etc. In one aspect the entire body of the living organism and its body parts (if any), their related color information, and their dynamic motion are included in different algorithms to analyze complex behaviors.

An aspect of the inventions includes multiple arenas including both different physical arenas and different virtual arenas. See for example, the virtual zones described in the U.S. Patent Application Publication No. 2004/0141635 to Liang, which is incorporated fully herein by reference. In another aspect the analysis algorithms allow different modules to be combined to obtain results for multiple behavior sets in a single operation.

In sum, a preferred system receives or records images of multiple living organisms from multiple points of view. The images are digitized, compressed and indexed, if necessary, and analyzed to identify certain pre-defined behaviors. The behaviors may be identified using different approaches, such as probabilistic and/or deterministic approaches. Preferably, the system uses one or more of the following methods to identify behaviors: rule-based analysis, token parsing procedure, sequence analysis, state change analysis, Hidden Markov Modeling (HMM), etc. Further, the system may be configured to identify the behaviors of animals as new behavior and as having a particular temporal rhythm or circadian rhythm.

First, the images are analyzed to detect foreground objects and perform body part segmentation. Detection and segmentation may be performed by method of background subtraction, previously described in the U.S. Pat. No. 6,678,413 to Liang at al, which is hereby incorporated by reference in its entirety. After foreground objects and individual body parts are identified, different methods of behavior identification can be used, depending on what paradigm this behavior belongs to. These methods include, for example, rule-based analysis, token parsing procedure, sequence analysis, state change analysis such as Hidden Markov Modeling (HMM).

The present system is capable of identifying behaviors of multiple animals with high accuracy. The occlusion problem (the situation when something blocks an animal from the camera's view) is resolved by the use of stereo-view connected object segmentation performed with the use of Inter-View Segmentation algorithms. The system also uses Stereo-View Integration procedure and Animal Size Normalization procedure to improve reliability of animal behavior identification.

The system of the present invention is capable of identifying both auto behaviors and social behaviors. Identified social behaviors include dominant/submissive behaviors, aggression/flight behaviors, maternal behaviors, and sexual behaviors. The system is particularly useful in identifying auto/social behaviors in group-housed environment, where occlusion problems may prevent other systems from accurate behavior identification. Stereo-view capabilities solve the occlusion problem and increase reliability of the findings.

BRIEF DESCRIPTION OF THE DRAWINGS

FIGS. 4 (a)-(c) are diagrammatic representations of reference lines and point from various perspectives related to a preferred inter-view correspondence process.

FIGS. 13 (b)-(d) are diagrammatic representations of the open-top insert from isometric view, side view and top view.

DETAILED DESCRIPTION OF THE DRAWINGS

Figure 1:
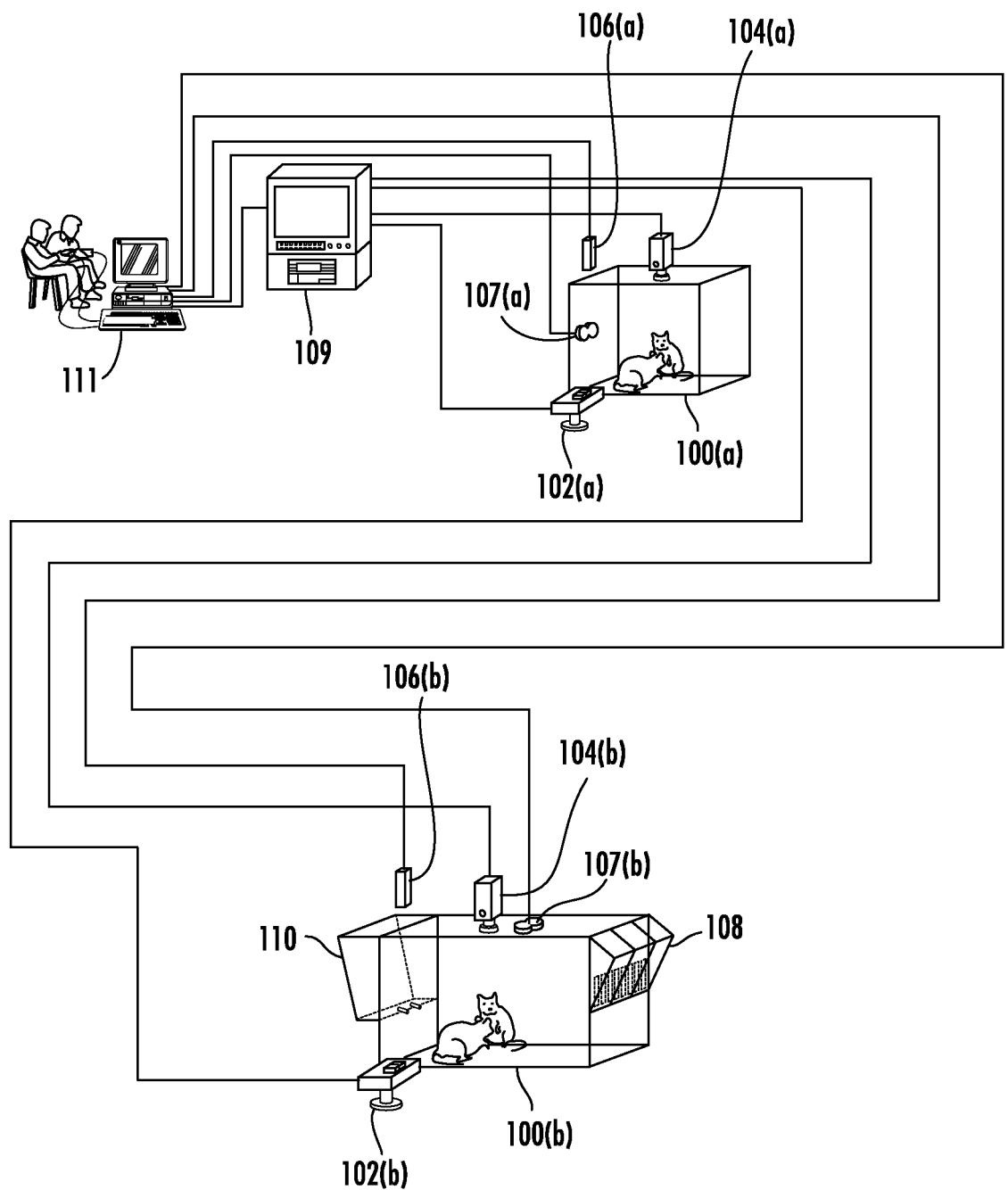
FIG. 1 is a diagrammatic representation of a preferred stereo-view multiple animal multiple arena behavior analysis system.

In general, the present invention identifies the behaviors of two or more living organisms being monitored in real time or from a recording. A preferred embodiment includes a system with multiple cameras connected to a computer. Preferably the computer includes one or more programs that can identify living organisms, track their movement, classify various shapes of parts of the living organisms, and identify one or more behaviors of these living organisms. The computer may be, for example, a personal computer, using either a Windows platform or a Unix platform, or a MacIntosh computer and compatible platform. The computer is loaded and configured with custom software programs (or equipped with firmware) using, for example, MATLAB or C/C++ programming language, so as to analyze the digitized video for animals' identification and segmentation, tracking, and/or behavior/activity characterization. This software or firmware may be stored in, for example, a program memory, which may include ROM, RAM, CD ROM and/or a hard drive, etc. In one variation of the invention the software (or firmware) includes a unique background subtraction method which is more simple, efficient, and accurate than those previously known. In a preferred embodiment the cameras are video cameras and the programs include various algorithms for analyzing the captured video images. Preferably the video images are digitized and the behaviors of living organisms are identified based on information obtained from selected video frames. A preferred system may perform its behavior identification by accessing a database of predetermined behaviors. The analysis may take place in real time from multiple cameras and/or from recorded images.

Detection and identification of parts of an organism, which is referred to herein as segmentation, based on a single view is often hampered by occlusions, including cases where one living organism, such as a mouse, in one of the views is completely or partially blocked by another mouse or when the mouse is hidden behind an object like a water spout or a food source. A preferred embodiment includes algorithms that solve this occlusion problem, including inter-view correspondence and constraints algorithms and inter-frame animal matching algorithms.

The system is preferably equipped with multiple recording devices, for example digital or analog cameras, that record the living organisms from different points of view, preferably a top view and a side view. However any number of recording devices may be used to ensure that the multiple living organisms are not occluded in at least one view. The cameras preferably simultaneously record images of living organisms in the selected arena. Preferably, the recording devices include a time stamping mechanism which may be later used to subsequently synchronize the two views. The arena may be an enclosure such as a home cage, group houses, a walkway, a treadmill, an aquarium, or other experimental test apparatus. It also can be an open area, certain types of open-field environments or enriched environments, etc. After the images are recorded, the images from each of the views are digitized on a frame by frame basis, if necessary. In one embodiment the living organisms are identified in each frame from each view. To accomplish this, a background subtraction process may be used. The identified living organisms are preferably matched with specific organisms. During the matching process, the living organisms may be identified based on data from previously analyzed frames and from cross-matching the organisms' images collected from different views. To assist in this process, the inter-view correspondence is established, for example, correspondence between a particular organism in one view with an area of possible locations for this organism in another view. Through calibration, a correspondence relation can be established between the multiple views. Using the interview correspondence, points in one view can be mapped to points or lines in another view and vice versa. Organisms identified in one view can be matched to animals identified in the other view using the interview correspondence. If discrepancies arise between views, a probabilistic or deterministic approach can be used to resolve these discrepancies.

After all the living organisms being monitored are identified, the system preferably performs stereo-view integration analysis. The system extracts information from the top view and side view (or other views if available) and uses this information to help identify behaviors. The process preferably uses information fusion, that is, utilizes information from each view, to assist with the identification of the living organisms' behavior.

In the stereo-view multiple animal multiple arena behavior analysis system illustrated in FIG. 1, an arena 100(*a*) and an arena 100(*b*) each contain multiple living organisms, preferably animals, for instance mice or rats or both. The animals in each arena are preferably monitored by multiple cameras. In the configuration of FIG. 1 there are two cameras for each arena, one providing images of the arenas 100(*a*) and (*b*) from a top view, 104(*a*) and (*b*), and one from a side view, 102(*a*) and (*b*). The system also preferably includes non visual monitoring devices 106 (*a*) and (*b*) for each arena, such as a microphone which provides non-visual information about the animals in the form of an audio-recording of animals' vocalizations, or a biophysical sensor that can measure the heart rate of the animals, etc. In addition, stimulus devices 107(*a*) and (*b*) may be employed that can provide various stimuli to the animals, such as a speaker that can provide tonal stimuli, an electrode that can provide electric shock stimuli, a light bulb that can provide light stimuli, etc. In addition, in the preferred embodiment, the stimulus devices 107(*a*) and (*b*) may be activated based on behaviors of the animals being monitored. Such behaviors include, for example, the animal pressing a lever, the animal located in a certain virtual zone, etc. The depicted system is capable of simultaneously monitoring a number of arenas 100(*a*) and (*b*) preferably on the monitor of a video multiplexer 109.

When the system is configured to record top view image of an arena 100, it would be beneficial if the top view camera 104 was able to obtain unobstructed view of the arena 100. Typically, a home cage or other type of arena, where animals spend extended periods of time, includes some means for providing food and water to the animals. Usually for this purpose the home cage includes a metallic grill or wire mesh insert, which is placed on top of the cage and extends inside the cage, where water container with spout and food pellets are placed in the basket. The animals can reach through the bars or the treads with their mouths or limbs to feed or drink. Also the animals typically grip the bars or mesh to climb, hang, etc. The typical inserts run across the entire top of the cage or arena with the food bin and water bottle placed in the middle. This configuration of the insert obstructs the view of the arena from the top.

Figure 13A:
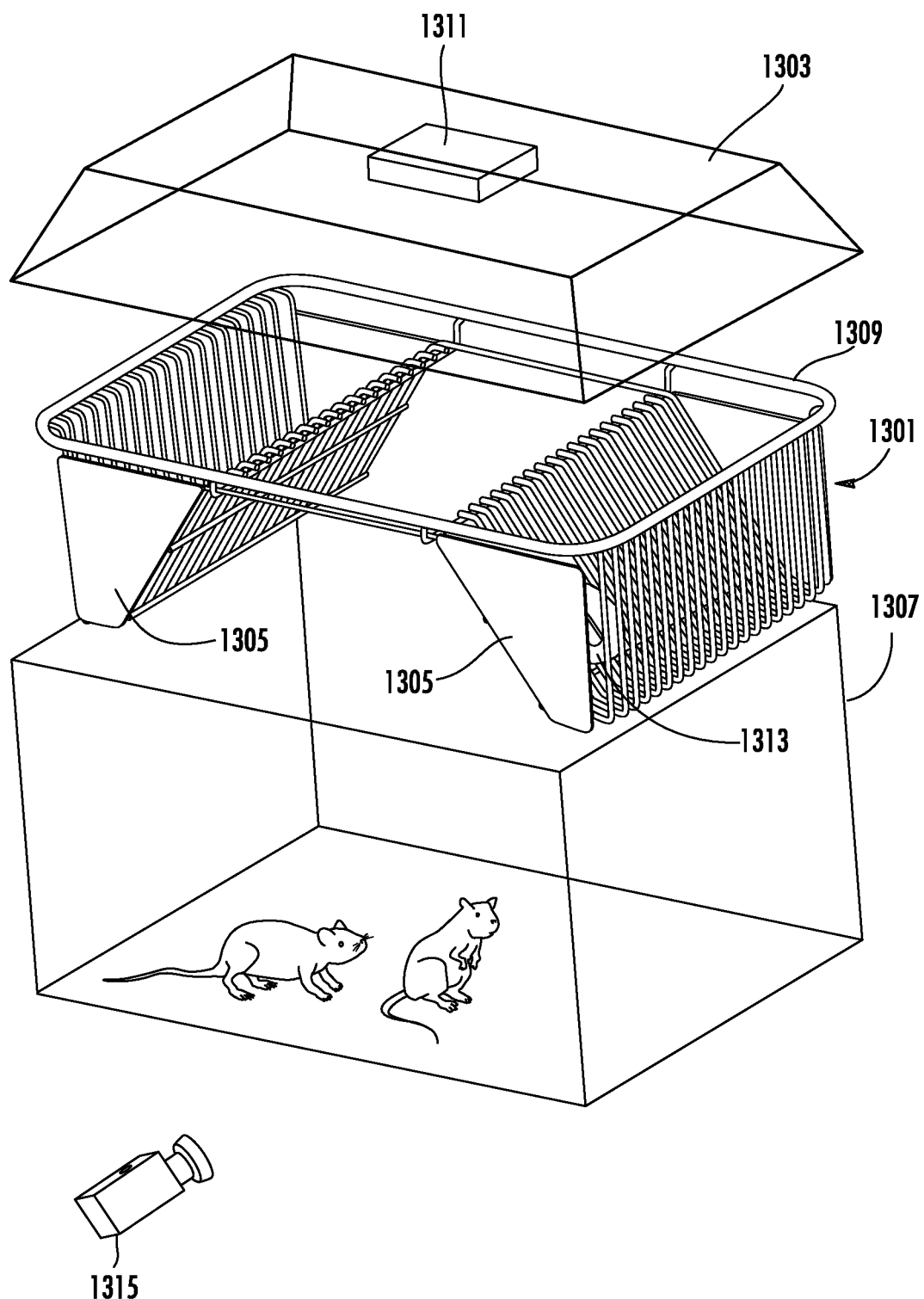
FIG. 13 (a) is a diagrammatic representations of a preferred stereo-view multiple animal arena with a preferred open-top insert.
Figure 13B:
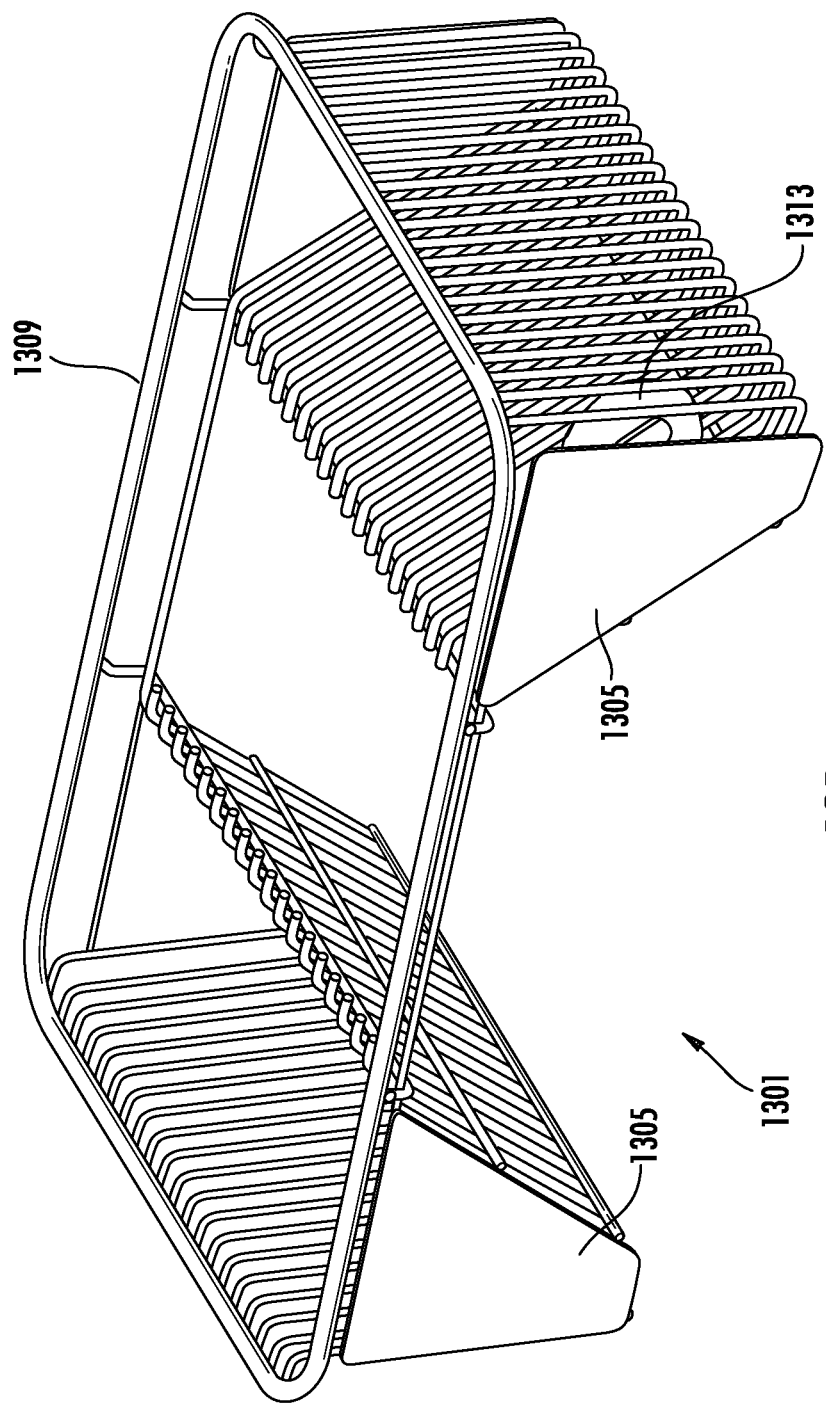
Figure 13D:
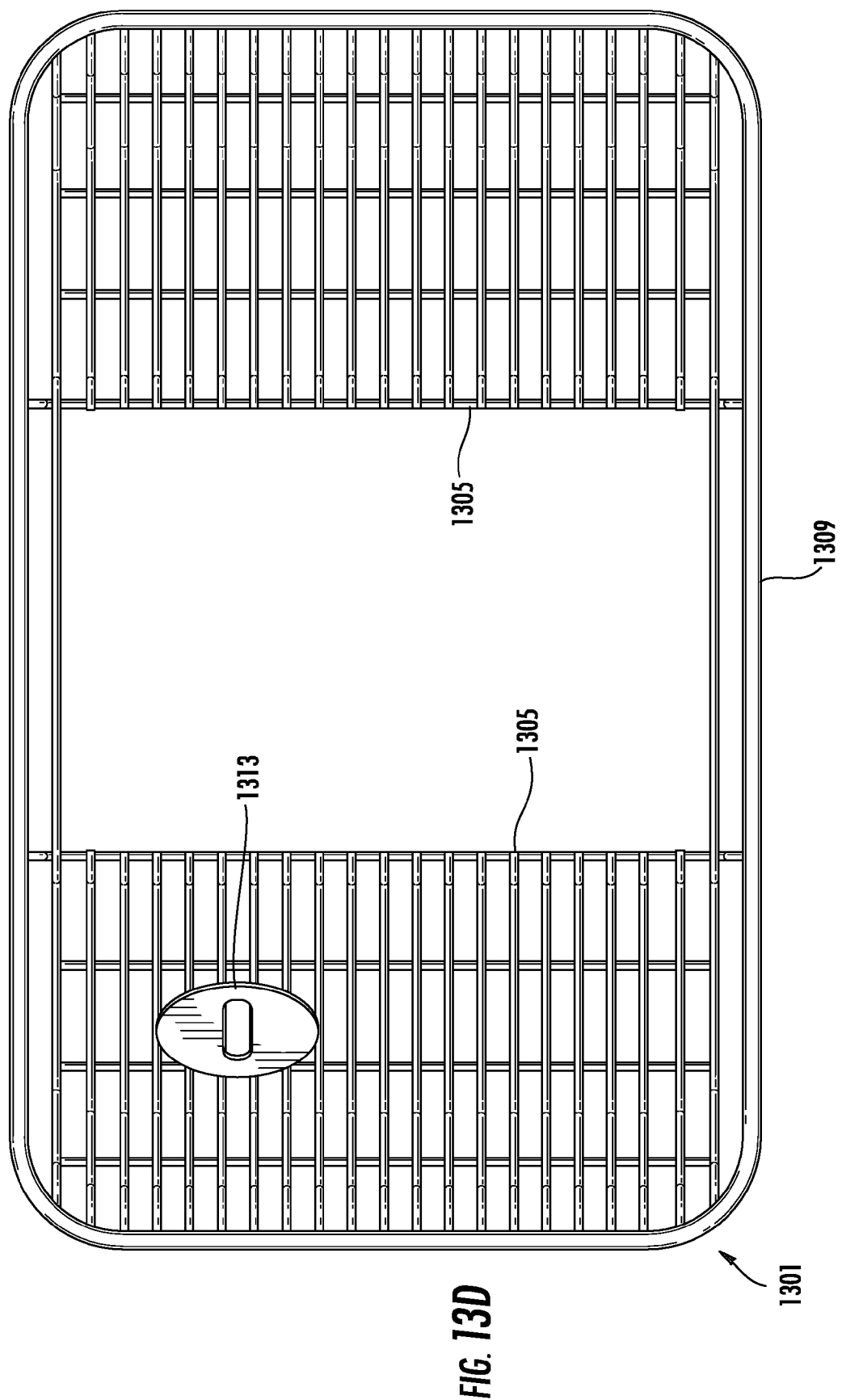

In a preferred embodiment, the system comprises an open-top insert 1301 with a lid 1303, as shown on FIGS. 13 *a-d*. This open-top insert has two baskets 1305. The two baskets are attached to the frame 1309 which approximates the perimeter of the top face of the arena. The two baskets 1305 are located at the opposite ends of the arena 1307 and have tapered profiles, wide on top and narrow on the bottom to allow unobstructed top view of the arena 1307. The baskets also do not reach the floor of the arena but are close enough to the floor to allow the animals to reach inside the baskets with their paws and mouths. The food and water are placed in the baskets and are easily accessible for the animals due to the spaces between the bars or mesh threads. In a preferred embodiment the insert 1301 also comprises a water bottle slot 1313 to allow secure fixation of the bottle and the spout.

The opening between the two baskets is covered with the lid 1303 to prevent the animals from jumping out of the arena 1307. In one of the embodiments the lid 1303 covers the entire top face of the arena and is transparent. In a preferred embodiment the lid 1303 is configured to only cover the opening between the baskets 1305 to allow better air circulation in the arena and yet preventing animals from escaping. Preferably, the system comprises both a transparent top covering the opening between the baskets 1305 and the lid 1303, covering the entire top face of the arena. This way the animals are prevented from jumping into the baskets 1305 and from damaging the top view camera.

In a preferred embodiment the top view camera 1311 is attached to the lid 1303. The camera 1311 is calibrated to capture the image of the entire arena. The tapered sides of the baskets 1305 allow for the unobstructed top view of the entire floor of the arena.

In a preferred embodiment the side camera 1315 is located, as shown on FIG. 13, to allow full view of both baskets 1305 and clear unobstructed view of the animals while eating or drinking.

One of the advantages of the present system is its ability to simultaneously process the images of multiple arenas taken by multiple cameras. This provides significant time saving for the system users. In another preferred embodiment there are more than two arenas where animals are being analyzed. For example, there may be as many different arenas as the computer's computing power allows and image resolution permits, for example four (4) or sixteen (16) or even more. These arenas may be physically separate arenas or virtual zones that are a single physical arena segregated by the computer programs. Multiple cameras may be monitoring and/or recording one or more animals in each arena from different views such as from the side of the arena and from the top of the arena. Examples of preferred arenas include home cages, open field cages, operant chambers, mazes or other experiment platforms. These different arenas can contain food supplies 108 and liquid supplies 110, with or without beddings and include different stimulus devices such as lights, speakers, electrical shocks, drug delivering devices, etc. The different arenas may also include enriched environment equipment such as running wheels, tunnels, igloos, etc.

In a preferred embodiment, the images are captured under various types of light conditions including visible, colored, sodium and infra-red light.

As shown in the embodiment in FIG. 1 a video multiplexer 109 preferably receives video signals from both cameras of arena 100(*a*) and both cameras of arena 100(*b*). The video multiplexer 109 combines these images into a single frame of video. The video signal is then transmitted to a computer 111. The transmission may be accomplished through a wired or wireless connection.

Figure 2:
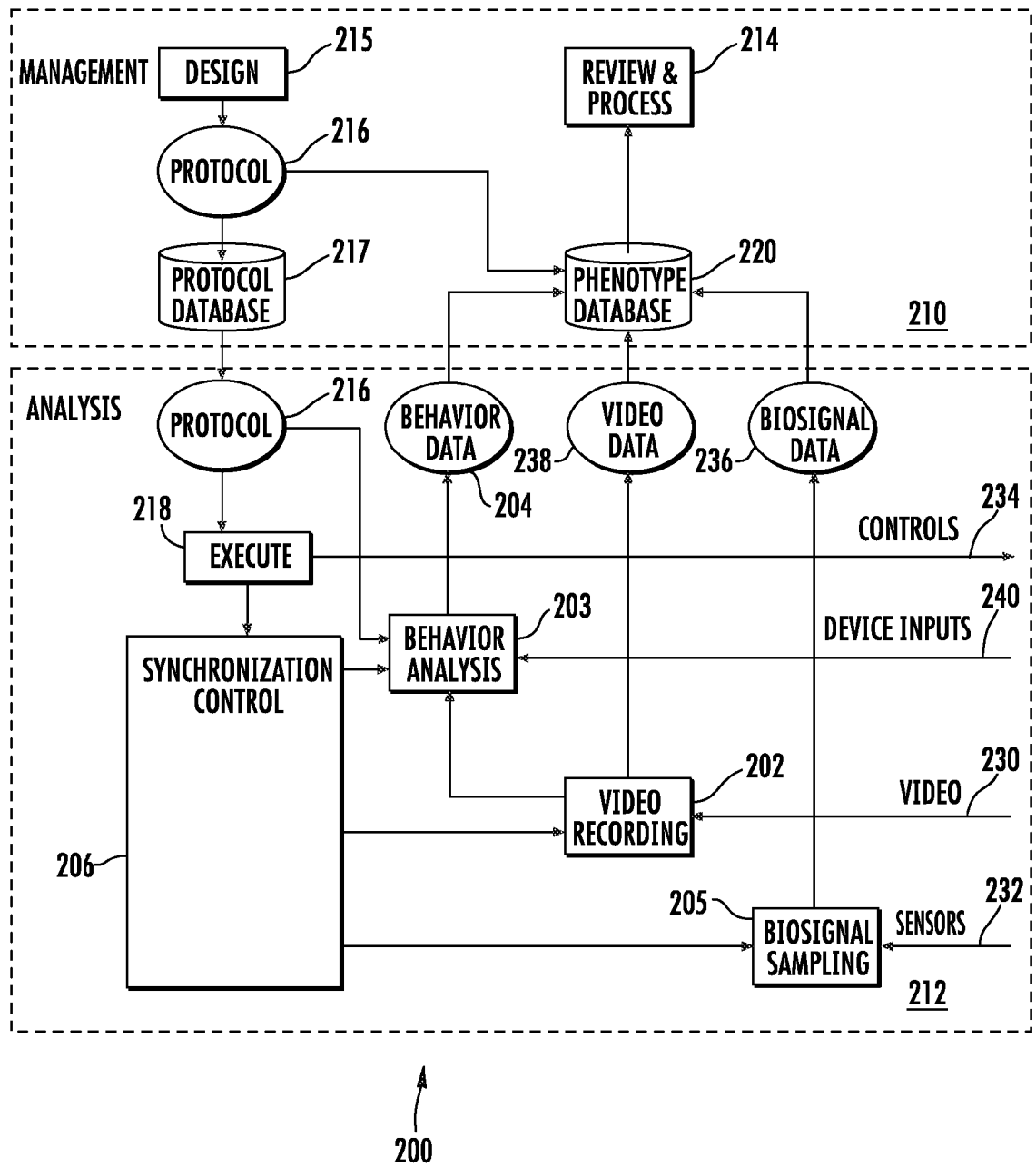
FIG. 2 is a representative block-diagram of a preferred stereo-view multiple animal behavior analysis system.

FIG. 2 is a functional block-diagram of the software modules of a presently preferred stereo-view multiple animal behavior analysis program 200. The system is broadly divided into two blocks: Management tasks block 210 and Analysis tasks block 212. The Management task block 210 includes tasks that are generally performed before the running of the experiment or series of experiments and after the experiment or series of experiments are finished. The Analysis tasks block 212 includes tasks that are generally performed during the conduction of the experiment.

The Management tasks block 210 preferably includes a Design module 215 and Review & Process module 214. The user through the user interface initially, using the design module 215, creates a protocol 216 of the experiment that he or she wishes to conduct.

The design module 215 preferably allows the user to select the arena, and calibrate the size of the selected arena, defining any virtual zones. Virtual zones are special zones or areas of interest. These virtual zones may be physically separate zones of the arena. Preferably, the virtual zones may not be divided from the rest of the environment and each other by any physical barrier, but are created by the design module software and are used to help identify the animals' behavior. The Design module 215 is essentially a translation of the experiment design scheme into a format understandable by the system.

In the Design module 215 the user also preferably defines the behavior identification parameters. For instance, for rule-based behavior identification, the Design module 215 allows the user to specify parameters of Spatial Relationships and Rules, determining behavior identification.

Preferably, the Design module 215 allows the user to set up Start/Stop Rules, Hardware Control Rules, Signal Output Rules, etc. These rules specify, for instance, when the experiment or a certain stage of the experiment starts/stops, when cameras 102 (*a*) and (*b*) and 104 (*a*) and (*b*) are activated and stopped, when the processing of the collected video and other data begins, where the collected data and the results of the data analysis are stored.

Preferably, in the Design module 215 the user is able to specify parameters for a series of experiments, running simultaneously or consecutively. The user is able to specify what animals participate in what experiment or series of experiments, the length and order of the experiments, etc.

In the Design module 215 the user also preferably defines operation protocol for the stimulus devices 107(*a*) and (*b*). In the Design module 215 the user specifies what events trigger activation of the stimulus devices 107 (*a*) and (*b*). For instance, these devices 107 (*a*) and (*b*) may be activated at the specific time predetermined by the user. Also, these devices 107 (*a*) and (*b*) may be activated in response to certain behaviors of the animals in the arena, such as pushing a lever or entering a certain virtual zone. The devices 107 (*a*) and (*b*) may be activated when a certain physical condition of the animal is present (such as a certain pulse level, body temperature, etc.), as detected by the non-visual monitoring devices 106(*a*) and (*b*).

After the user runs the Design module 215, this module 215 generates a Protocol 216, which describes all user-defined particulars of the experiment or series of experiments. Preferably the Protocol 216 is stored in a Protocol Database 217. Also, preferably the Protocol 216 is stored in a Phenotype Database 220 for reference in experiment result analysis and review. Alternatively, the Phenotype Database 220 is at least partially linked with the Protocol Database 217.

The Analysis tasks block 212 preferably includes an Execute module 218. The Execute module 218 has as an input the Protocol 216 and outputs Control signals 234 to the hardware of the system (such as cameras 102, 104, bio sensors 106, stimulus devices 107, etc.). In a preferred embodiment, the Execute module 218 generally begins the experiment after the user places the animals at the appropriate arena, by turning on various sensors (cameras 102, 104, bio sensors 106, etc) and initiating any software tasks for collecting video and sensor data (e.g. starting video recording, sensor data collection and analysis of the collected data).

The Video Recording module 202, Bio Signal Sampling module 205, Behavior Analysis module 203 and Synchronization module 206 are preferably included in the Analysis tasks block 212.

During the running of the experiment, preferably the Bio Signal Sampling module 205 receives as input the sensor signals 232 from the bio sensors 106. The Bio Signal Sampling module 205 also receives as an input signal from the Synchronization module 206. The Signal Sampling module 205 stamps the sensor signals with synchronization time stamp and outputs the resulting Bio Signals Data 236. The Bio Signal Data 236 is stored in the Phenotype Database 220 for further review and processing.

Preferably, at the same time the Video Recording module 202 receives video signal 230 from the video cameras 102, 104. The Video Recording module 202 also receives synchronization input from the Synchronization module 206 and stamps the video signal 230 with synchronization time stamp and outputs the resulting Video Data 238 to be stored in the Phenotype Database 220.

The Video Recording module 202 also preferably passes video signal on to the Behavior Analysis Module 203. Preferably, the Behavior Analysis Module also receives as an input the device inputs 240 and communicates with the Synchronization module 206 and Protocol module 216, so that the Behavior Analysis module 203 can analyze the received video data 230 to identify behaviors as defined by Protocol 216 with reference to status of actions of the stimulus devices 107. The Behavior Analysis module 203 outputs the results of its analysis as Behavior Data 204. The synchronized Behavior Data 204, Video Data 238 and Bio-Signal Data 236 are preferably input to the Phenotype Database 220 which stores the results.

The Phenotype Database 220 is preferably an Oracle or Microsoft Access database and can include tables linked to the tables in the Protocol Database 217 which stores all the Protocol 216 files. The Phenotype Database 220 preferably collects the analysis results from the Behavior Analysis module 203. These results directly refer to the experiment Protocol 216 stored in the Protocol Database 217.

The Management tasks block 210 preferably includes a Review and Process module 214. The Review and Process module 214 allows the user to collect results from the experiment, organize the results, calculate various statistics and compare the results within the experiment group, as well as to other relevant data. Preferably, the Review and Process module 214 is able to retrieve data collected during previous experiments and stored in the Phenotype Database 220 and Protocol Database 217. During the review process, the Review and Process module 214 allows the user to play back the entire video or portions of the video, including the portions of the video corresponding to specific identified behaviors. Preferably, the Review and Process module 214 allows the user to specify a behavior and the Review and Process module 214 will display the corresponding portions of the video.

Preferably, the Review and Process module 214 enables the user to revise the Protocol 216 and run Behavior Analysis module 203 with a revised Protocol 216 on previously analyzed video input. As a result, the user obtains two or more sets of data analysis results for the same experiment, where the sets differ due to changes in protocols for behavior data identification.

Preferably, the output of the Review and Process module 214 can be directly exported to various third-party software such as Microsoft Excel, SPSS, etc.

Groups of results can also be exported together into a single file as a spreadsheet. For example, during an experiment, if the user conducts various trials with animals and the animals are mainly divided into two groups—Group A and Group B. The user may wish to export results for all Group A animals to a single spreadsheet and all Group B animals to another spreadsheet. This further allows the user to determine averages and standard deviations of various measurements or behavior results within each of these two groups so that they can be compared to each other or to other relevant data.

Figure 3:
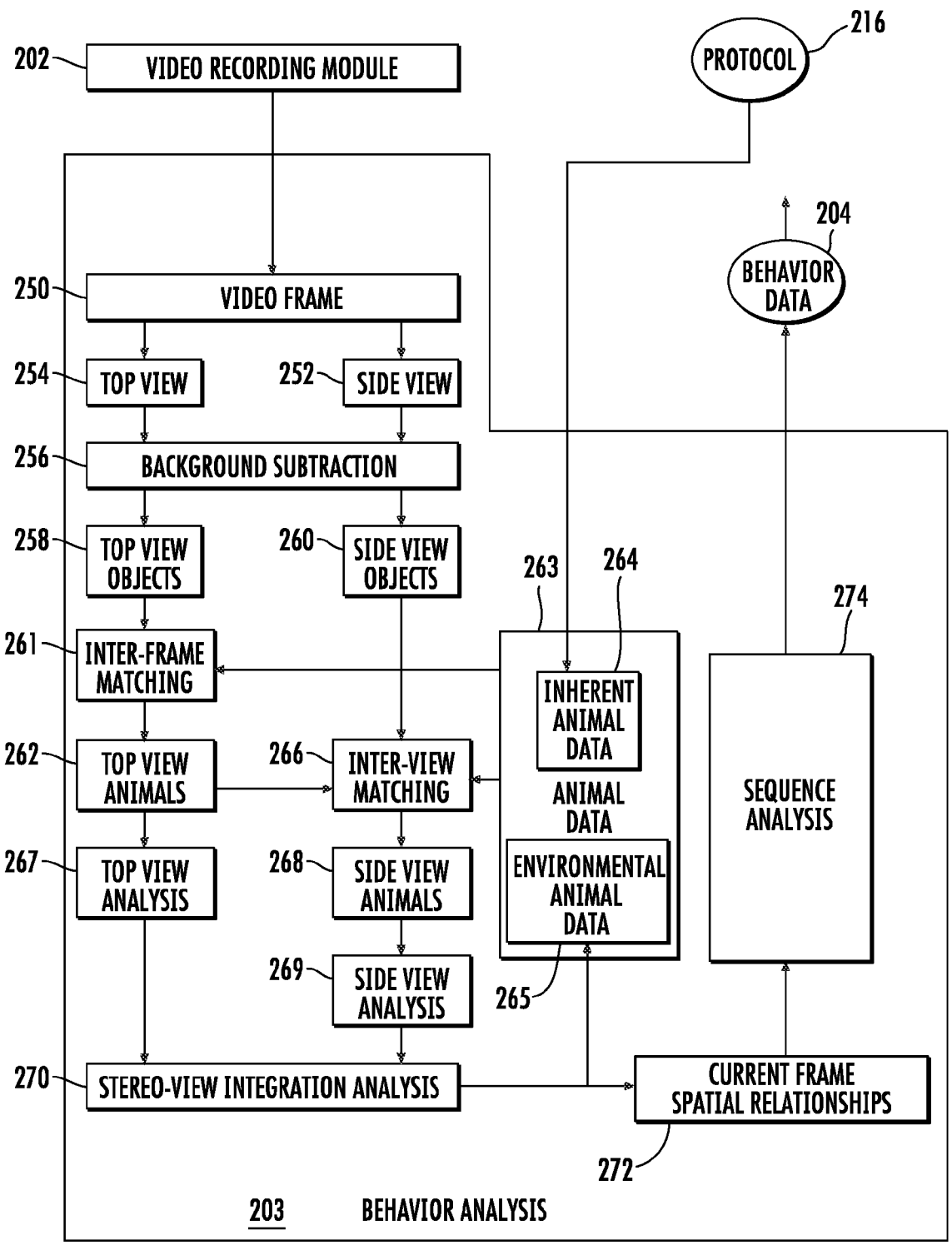
FIG. 3 is a high level flow chart of a preferred behavior analysis module of the present invention.

FIG. 3 is a preferred flow chart for the behavior analysis module 203. As indicated above, the behavior analysis module 203 receives video images from video recording module 202. In one of the embodiments, the video recording module 202 may be housed in the video multiplexer 109. In the preferred embodiment, the Video recording module 202 is implemented by the computer system 111. Preferably, the video recording module 202 may include a digitization/compression unit. The digitization/compression unit may convert analog video and audio into a digital video format, for example, MPEG or AVI. Furthermore, preferably the Video Recording Module 202 matches the frame image from each camera so that the frame from, for example, the top camera 104, is displayable on video monitor 109 on the right and the frame from, for example the side camera 102, is displayable on the left. Alternatively the behavior analysis module can perform the digitization/compression and frame formatting and synchronization.

In a preferred embodiment, the system receives incoming video images from either the video cameras in real time or pre-recorded from the video record/playback unit. If the video is in analog format, then the information is converted from analog to digital format and may be compressed by the video digitization/compression unit. The digital video images are then provided to the behavior analysis module 203 and stored on the computer where various processes are undertaken to segment predetermined animals and their body parts from the images and to identify the animals' behavior. Meanwhile, the digital video images are synchronized with data from the synchronization control module 206 and indexed so that each image can be randomly searched and retrieved later. The video images 230 can be images from one of the cameras 102, 104 of the system, or an image combining individual images from two or more cameras, recording activity in one arena, or combining images from cameras recording experiments in different arenas.

Referring to FIG. 3, in a preferred embodiment a video frame 250 is received by the behavior analysis module 203 and comprises a top view image of the arena on the left side of the frame, e.g., top view 254, and a side view image of the arena on the right side of the frame, e.g., side view 252. Each of the digital images is processed to identify and segregate the desired (predetermined) animals from the frames of incoming video. This process may be achieved using, for example, background subtraction, mixture modeling, robust estimation, and/or other processes.

In a preferred embodiment, the behavior analysis module 203 performs background subtraction 256 on the top view image 254 and the side view image 252 simultaneously. Preferred background subtraction methodologies are described in detail in U.S. Pat. No. 6,678,413 to Liang at al, which is incorporated herein by reference in its entirety. Alternatively, the top view image 254 and the side view image 252 can be subjected to background subtraction individually. In other embodiment, background subtraction is performed on several images from each of the views at the same time. These images can be different view images of the same arena or of different arenas.

The background subtraction 256 results in the isolation of foreground objects. The foreground objects isolated in the top view images 254 are called top view objects 258. The foreground objects isolated in the side view images 252 are called side view objects 260 Next, the system matches identified objects with individual animals. In one embodiment, initially top view objects are subjected to an inter-frame matching process 261. The inter-frame matching process assigns Animal IDs to the identified top view objects 258 based on animal data 263.

Animal data 263 is a set of data for the animals being monitored in the arena. The data can include inherent animal information 264, that is information about the animal that is not experiment dependent and can be obtained prior to the start of the experiment, e.g., the color of the animal, the color distribution through the animal's body, the animal's size, specifics about the animal's phenotype, any specific identification marks of the animal. It can also include environmental animal information 265, that is information about the animals generated during the experiment, for example, the location of the animal in one or more frames, information about the location of the body parts of the animal in one or more frames, the orientation of the animal in one or more frames. Some parts of the animal data 263, such as, for example, color, is permanent for an animal ID. Some parts of the data, such as animal's location, are updated throughout the analysis process. The animal data 263 is preferably obtained in part through a close loop feedback process. Environmental animal information 265 is updated as the information is generated by the system, whereas inherent animal information 264 is input from the computer system 111, preferably from protocol database 217.

Preferably, after top view objects 258 are identified as top view animals 262, an animal identification process is performed on side view objects 260. In the preferred embodiment, the system 200 performs inter-view matching 266 on the side view objects 260 with the top view animals 262, assigning the side view objects 260 animal IDs based on the results of the inter-frame matching 261 performed on the top view objects 258. In another embodiment, side view objects are matched with individual animal IDs by the inter-frame matching procedure 261 performed on the side view objects 260.

In another embodiment, the system 200 initially performs an inter-frame matching procedure 261 and then the inter-view matching procedure 266 to confirm or disprove the results of the inter-frame matching procedure 261.

In another embodiment, initially an attempt is made to identify the side view objects 260 by the inter-frame matching process 261 as discussed above with regard to the identification of top view animals. When the side view object 260 cannot be reliably identified just by the inter-frame matching process 261, the inter-view matching process 266 is applied to such objects.

Preferably, in design module 215, the user selects which procedure(s) (inter-view and/or inter-frame) are used for the second view animal identification.

The inter-view matching process 266 uses information from images of different views of the same arena to identify animals in one of the views. For example, in a preferred embodiment, the inter-view matching process uses the information obtained from the top view images 254 and the side view images 252, to identify animals in the side view images.

To perform inter-view matching, the program establishes inter-view correspondence based on the geometry of the arena, i.e., for each point in one view the program identifies its appearance zone in another view. For the object identified in the first view image, this object's appearance zone is an area in the image in the second view, consisting of all possible locations, where the same object can appear.

In a preferred embodiment, the first view is a top view and the second view is a side view. The program calculates an appearance zone for the identified top view image by an interview correspondence procedure. Referring to FIGS. 4(*a*)-(*c*), the program first establishes a projection correspondence map between a rectangle defined by the edges abcd in top view image, see FIG. 4(*a*), representing the top face of the arena in top view, and a trapezoid abcd in side view, see FIG. 4(*c*), representing the top face of the arena in side view. In other words, for every point of the top view image of the top face of the arena the program identifies a single corresponding point that represents it in the side view image of the top face of the arena.

The program also establishes correspondence map between the rectangle efgh in top view, see FIG. 4(*a*), representing the floor of the arena in top view, and the trapezoid efgh in side view, see FIG. 4(*c*), representing the floor of the arena in side view.

FIG. 4*b* shows an isometric view of the arena.

To generate an appearance zone for a single point P, in a preferred embodiment, the program first determines the location of point P in the top view image, as shown on FIG. 4(*a*). Just based on the top view image, we cannot deduce the distance between point P and the floor of the arena-based on this limited information, point P can be located on the floor, on the ceiling or anywhere in between. Based on the location of point P in top view image and previously created correspondence maps, the program calculates corresponding points P' and P" in the side view image of the arena. Point P' represents location of point P in the side view image, if we assume that point P is located on the top face of the arena. Point P" represents location of point P in the side view image, if we assume that point P is located on the floor of the arena. Since we do not know the distance between point P and the floor of the arena, the straight line segment, defined by points P' and P", represents all possible appearances of the top view image point P in the side view image. In other words, knowing location of point P in top view, we can apply interview correspondence procedure to identify all possible locations of this point P in the side view image as a segment P'P". To illustrate it further, if we look at the segment P'P" from the point of view of the camera 104, this segment will collapse into point P. The segment P'P" forms a side view appearance zone of the top view point P.

Figure 5A:
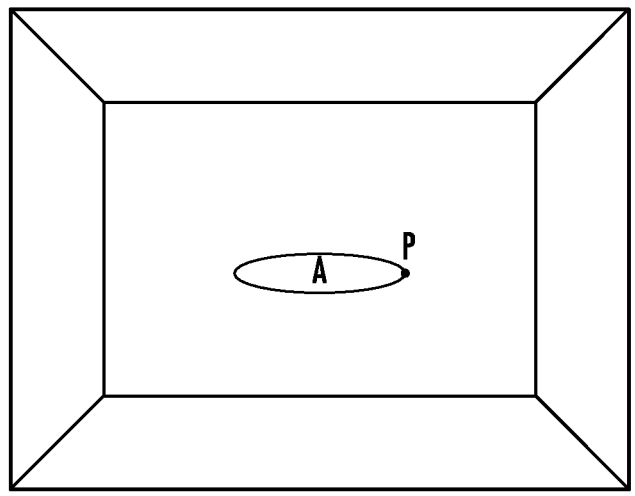
FIGS. 5 (a)-(b) are diagrammatic representation of objects from top and side view related to a preferred inter-view correspondence process.
Figure 5B:
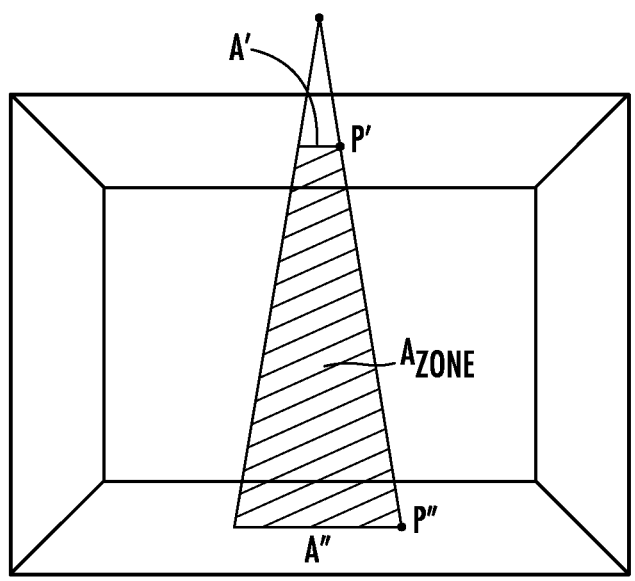

To illustrate the process of generating an appearance zone for a top view object, we refer to FIGS. 5(*a*) and 5(*b*). For each point P of the top view object A (FIG. 5(*a*)), the program generates corresponding side view points P' and P". Points P' and P" are side view images of point P at the floor of the arena and at the top face of the arena. A straight line segment P'P" forms an appearance zone for point P in side view. After the same procedure is repeated for all points, forming object A, the individual line segments, representing each point of object A, together form a trapezoid $A_{zone}$ which comprises an appearance zone of the top view object A in the side view image.

The top view animal identification is preferably initially used by the inter-view matching process 266 to establish side view appearance zones for the top view objects. When the side view objects 260 are separated, i.e. the animals are not blocking each other in the side view image 252, the top view animal identification 262 is used in the inter-view matching procedure 266 to generate a correspondence between the top view objects 258 and the side view objects 260. In other words, the system finds correspondence between locations of the top view animals and possible locations of these animals in the side view, based on the side view appearance zones of these animals. If appearance zones of the animals do not overlap, and there is only one side view object in each zone, this side view object is identified with the same animal ID as the corresponding top view animal. If the side view animals block each other, the program utilizes a segmentation procedure to identify the side view objects in question. When one of the animals blocks another animal in side view, the resulting side view object is a connected side view image, representing both animals. In this situation the program performs connected object segmentation procedure on such objects.

Figure 6A:
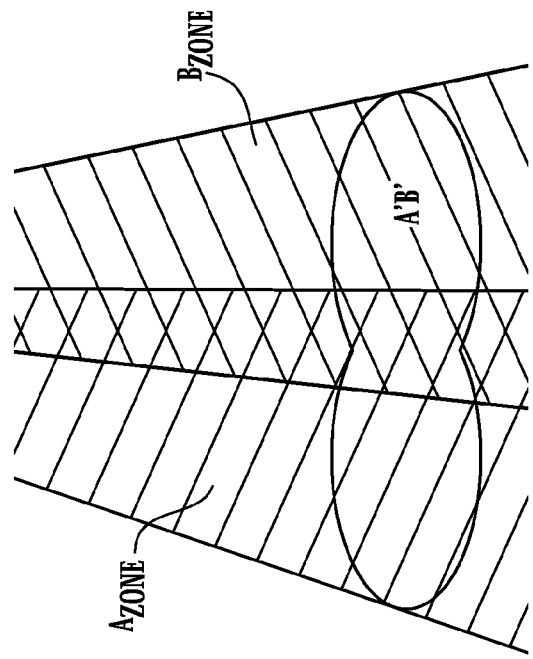
FIGS. 6 (a)-(c) are a diagrammatic representation of multiple views of multiple animals, related to the preferred animal separation process.
Figure 6B:
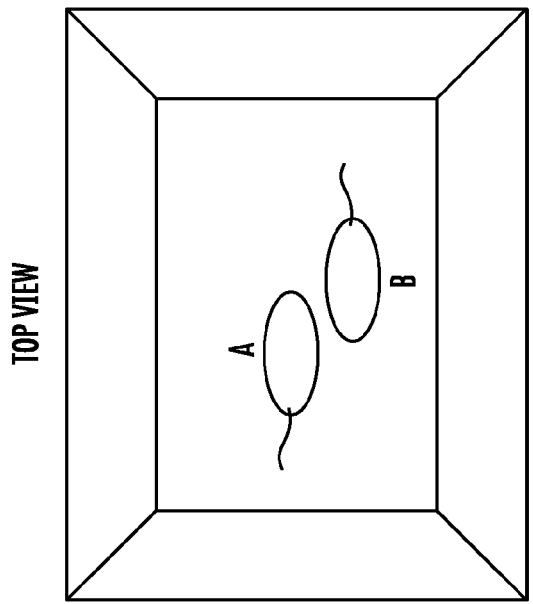
Figure 6C:
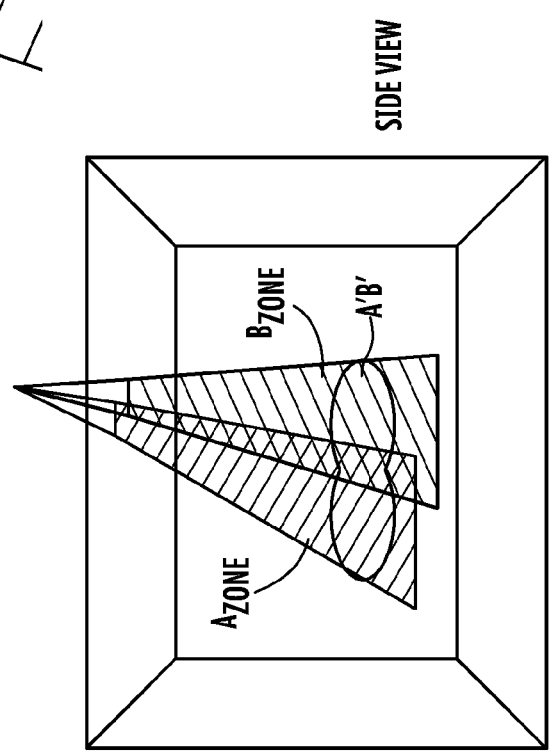

Initially, the program identifies appearance zones of all previously identified top view animals. For connected side view objects, at least a part of the connected object is going to be within more than one appearance zone. As illustrated in FIG. 6, the top view animals A and B (FIG. 6(*a*)) are represented in the side view (FIG. 6(*b*)) by corresponding appearance zones $A_{zone}$ and $B_{zone}$. These appearance zones overlap and the connected side view image A'B' is located within the combination of these zones.

Figure 7A:
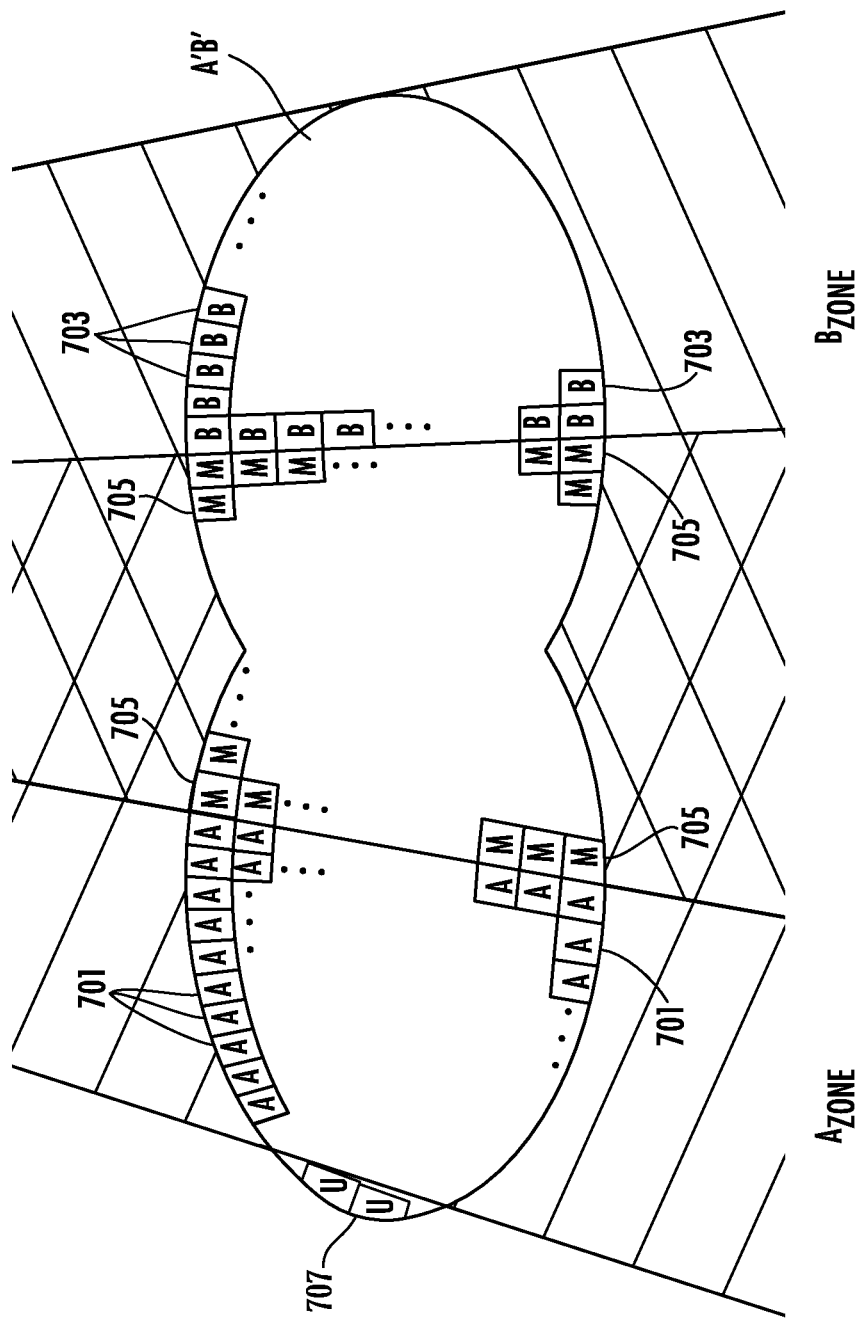
FIGS. 7 (a)-(c) are a representation of a preferred animal separation process.
Figure 7B:
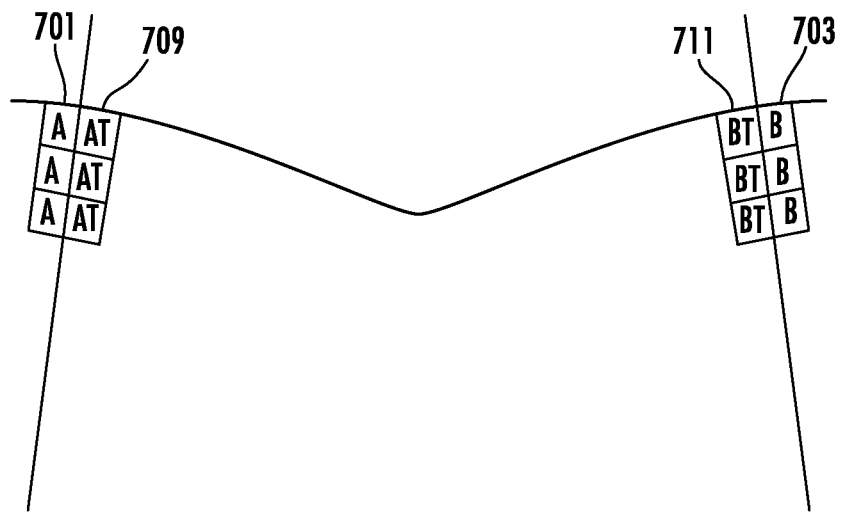

In a preferred embodiment, the connected object segmentation is performed by a segmentation algorithm, illustrated by FIGS. 7 (*a*)-(*b*).

First, after the connected object A'B' is identified, the program identifies a set of side view appearance zones C, where for each appearance zone in the set C, there is at least one pixel of the connected object A'B' located within that zone.

Second, for each pixel in the connected side view object A'B' the program determines how many appearance zones this pixel belongs to. If the pixel belongs to only one of the appearance zones, the program marks this pixel with the corresponding Animal ID. Referring to FIG. 7(*a*), pixels falling only within $A_{zone}$ 701 at this stage are marked A; pixels falling only within $B_{zone}$ 703 are marked B. Pixels falling within more than one zone 705 are marked M. Pixels falling outside any appearance zone 707 are marked U.

As a third step, preferably, the system identifies a set of top view animals $C_{top}$ corresponding to the set of appearance zones C. From the top view image 6(*a*), the program determines which one of the animals is located closest to the side view camera, the front animal.

As a fourth step, all pixels marked M are assigned the animal ID corresponding to the front animal. For pixels marked U, the program finds pixels having at least one neighboring pixel having animal ID. Such U pixel is assigned the same animal ID as its neighbor. This step is repeated until all pixels marked U are assigned an animal ID.

Figure 7C:
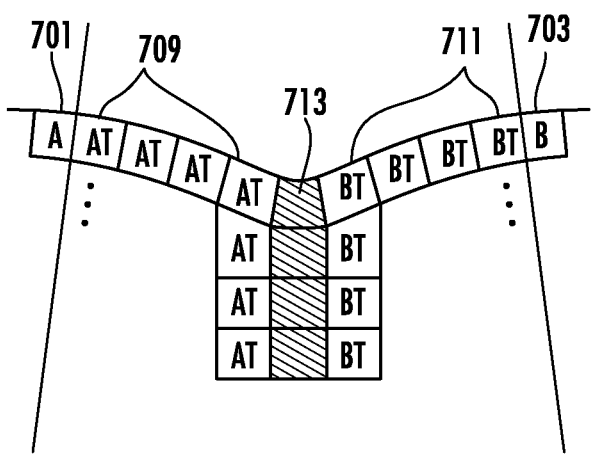
Figure 8:
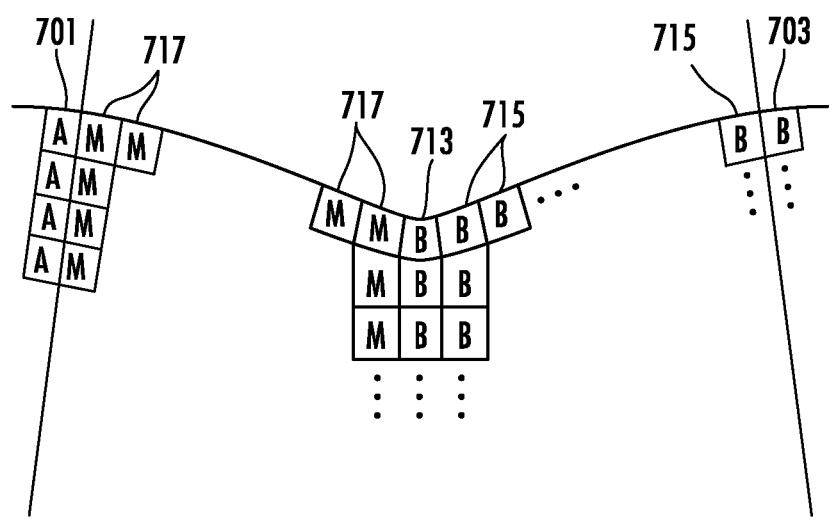
FIG. 8 is a block diagram of a preferred animal separation process.

In another embodiment, as a fourth step, the program applies an area growing algorithm to the initially segmented object. First, the program finds pixels marked with "M" or "U" and having at least one neighboring pixel with an identified animal ID, 709 and 711. After the group of neighboring pixels with animal IDs for the pixel is identified, the program checks whether these animal IDs are from the same animal. If all neighboring pixels with animal IDs have the same ID, the "M" or "U" pixel 709 or 711 is assigned the same animal ID as its neighbors and a temporary flag. If a pixel 713 has more than one neighboring pixel 709 and 711 with an assigned animal ID (border pixel) and these IDs are not the same (see pixels 713 as illustrated in FIG. 7c), the program chooses between the possible animal IDs using the previously known animal data, such as the color distribution of the animals corresponding to the IDs in questions, etc. Such pixel 713 receives permanent animal ID. At this point for all pixels with the same temporary animal IDs as the border pixel the program changes status of their IDs from temporary to permanent 715 (see FIG. 8). For all pixels with the temporary animal IDs different from the border pixel's 713 animal ID, their marking changes back to M (pixels 717, FIG. 8). This step is repeated until all pixels in the connected object are assigned permanent animal IDs.

In another embodiment, in the fourth step of the segmentation algorithm, for each pixel marked with M or U the program assigns the pixel an animal ID from the $C_{top}$ set of top view animals based on the previously known animal data, such as the color distribution of the animals corresponding to the IDs in question, previous known positions of the animals, etc.

The segmentation algorithm can also be used when a connected object represents more than two animals.

Alternatively, when top view objects are connected, side view identification of animals can be used to perform top view connected object segmentation. In general, in case when the system utilizes more that two views or different camera orientations, animal identification from one view can be used to support connected object segmentation in another view.

Returning to FIG. 3, after all top view objects 258 and side view objects 260 are identified as top view animals 262 and side view animals 268, the program analyzes the identified animals. Top view animals 262 are analyzed by a top view analysis module 267 and side view animals 268 are analyzed by a side view analysis module 269. Modules 267 and 269 detect such information about the analyzed animals as, for instance, the animal's location, orientation, locations of the animal's body parts, location of the animal's body parts in relation to other animals and inanimate objects.

In a preferred embodiment, the results of the top view analysis and the results of the side view analysis are fed to a stereo-view integration analysis module 270. This module performs integration of the information obtained from all available views.

In general, in stereo-view analysis the animal analysis data obtained from one of the views is used to compliment and complete the animal analysis data obtained from the other view. In a preferred embodiment, the program applies stereo-analysis procedure to all identified behaviors, including social behaviors, such as joyful play, dominant/submissive behaviors, aggression/flight behaviors, mating behaviors, and maternal behaviors, and auto behaviors. For instance, from the top view the system identifies that two animals are in close contact with each other, where the first animal's nose is in close proximity to the second animal's head. When this information is combined with the information, obtained from the analysis of the corresponding side view animal, that the nose of the first animal is touching the head of the second animal, the system can conclude that the Sniffing Head Behavior is present with a higher degree of reliability.

In another example, based on the top view image, the program identifies that an animal is in close proximity to a water spout. Then the program integrates the findings of the side view analysis of this animal. If the side view image analysis shows that the animal's mouth is elevated to the same height as the water spout, the program confirms initial finding of Drinking Behavior. If the animal's head is above or below the spout, the program refutes earlier identification of Drinking Behavior.

Similarly if the analysis of a side view image of the animal shows that the animal's head is in close proximity to the water spout and is elevated to the same height as the water spout, the stereo-view analysis may prove or disprove the conclusion of Drinking Behavior. If the program identifies in top view analysis that the animal's moth is in contact with the water spout, the Drinking Behavior identification based on the side view analysis is confirmed. If the program identifies in top view analysis that the animal's mouth is to the right or to the left of the spout (i.e. in side view the animal is behind or in front of the water spout and is just facing in the same direction as the water spout), then the program refutes the Drinking Behavior identification.

In general, the purpose of the stereo-video analysis module is to create synergy by cross-referencing information from one view to the other in order to better identify the position of each animal and its body parts with reference to other animals and inanimate objects, so that a more accurate analysis of the behavior of the animal(s) is obtained.

Animal Size Normalization

In a preferred embodiment, as part of the stereo-view integration analysis, the program applies an animal size normalization procedure to the top view and side view animals.

In previous systems, where only a side view analysis was performed, a projection effect was greatly affecting analysis of the images. When an animal is located close to a camera, its image is significantly bigger than when the same animal is located at the far end of the arena. This phenomenon is called a projection effect. Because the side view/front view camera is generally close to the housing device, projection effect is very apparent in that view. The difference in apparent size of an animal when it is near the camera and when it is at the far end of the housing arena may cause problems when side view behavior analysis is performed based on size-related features. In a preferred embodiment, to solve this problem the program of the present invention utilizes size-normalization procedure.

In the earlier systems, where only side view/front view information was available, the size-normalization was performed using animal's standing point, which is the lower boundary of the animal's body. However, this method is not reliable when there is animals' bedding covering the floor in the housing device, which is a typical case. Besides, size-normalization using animal's standing point is sensitive to noise, shadow and various environmental factors. The present system uses results of top view analysis for size-normalization.

Figure 9A:
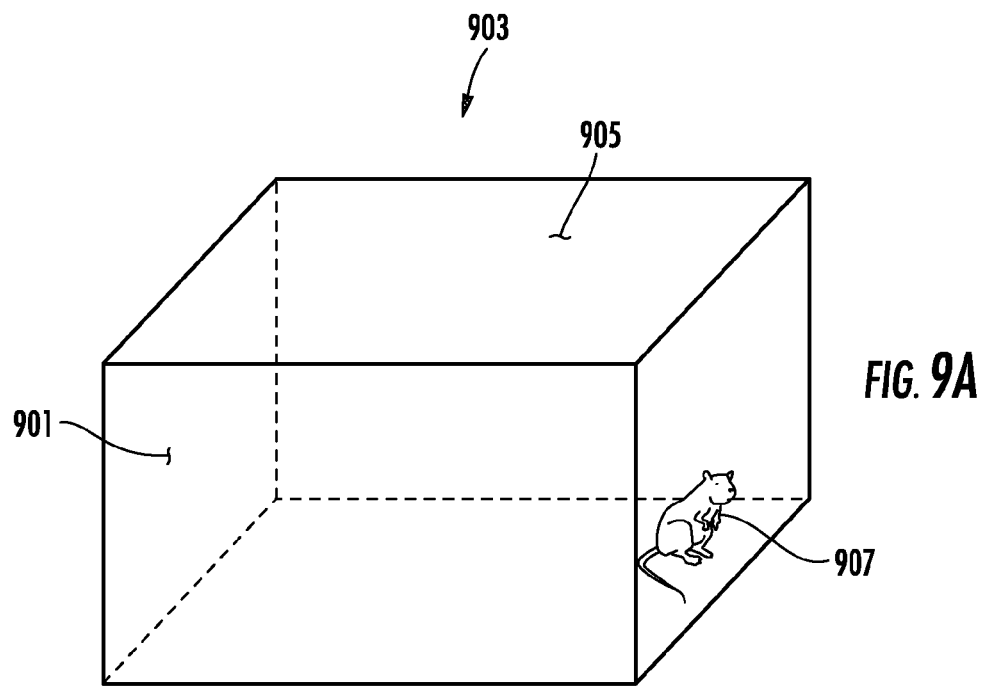
FIGS. 9 (a)-(c) are a diagrammatic representation illustrating a preferred size normalization process.
Figure 9B:
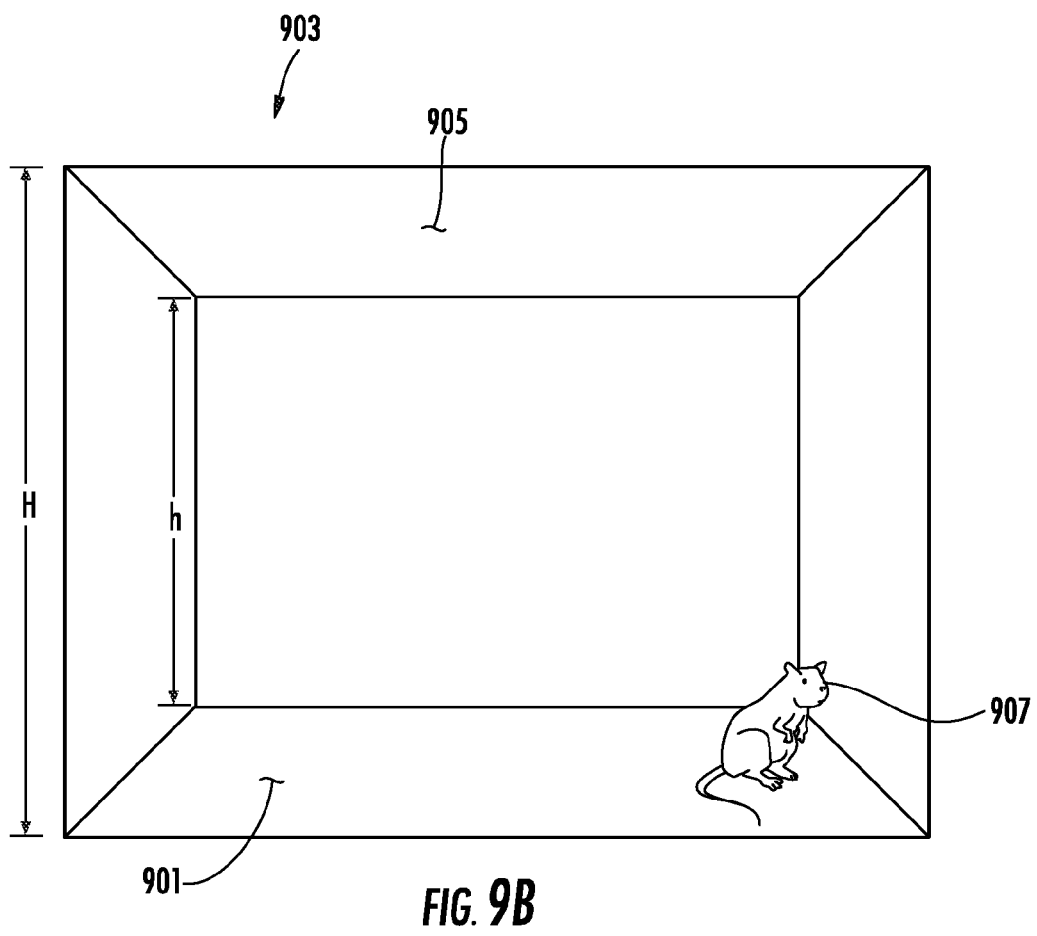
Figure 9C:
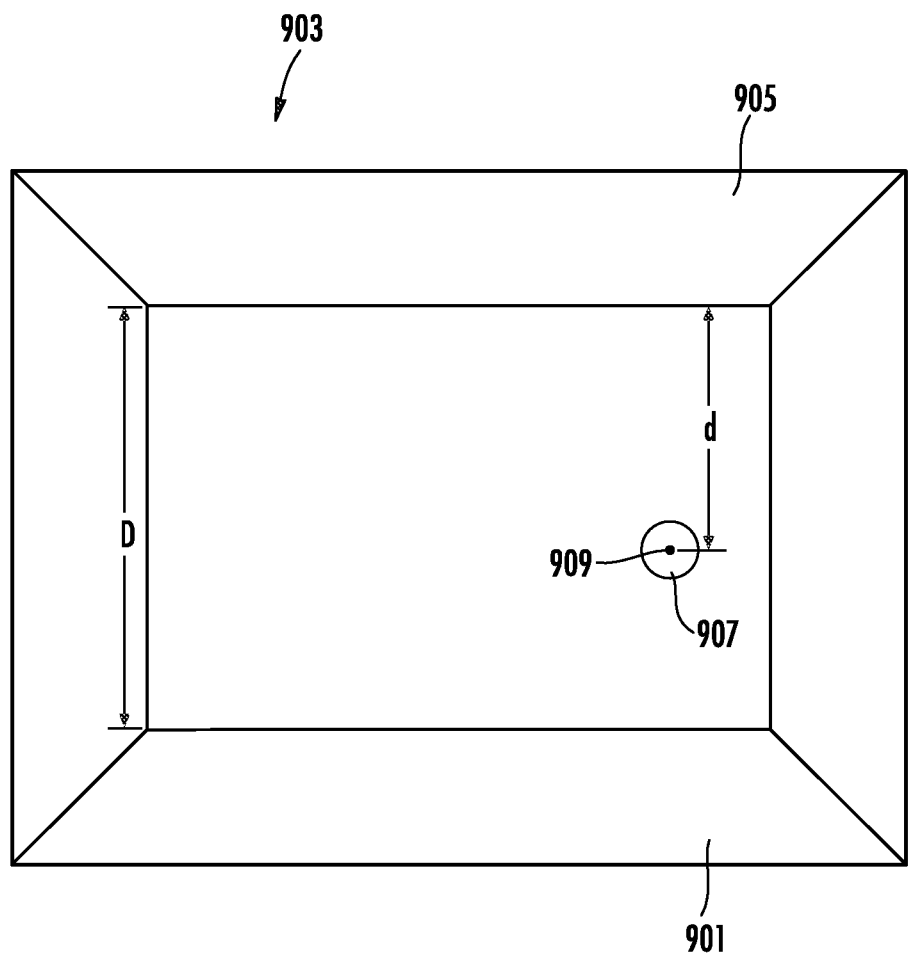

In a preferred embodiment, initially the program performs calibration procedure, which includes determining the distance between the front wall 901 of the arena 903 (closest to the side view camera) and the back wall 905 of the arena. The program also determines ratio of the height H of the front wall 901 of the arena 903 in the side view image (see FIG. 9b) to the height h of the back wall 905 of the arena 903 in the side view image. Based on these measurements, the program calculates an adjustment coefficient for adjusting the size of a side view image of an animal. To normalize the size of an animal 907 in the side view image, the system analyzes the top view image (FIG. 9c) of the same animal 907, determining the depth D of the arena 903 and the distance d between the animal's center 909 and the back wall 905 of the arena, i.e. the program determines the depth of the animal's location in the housing device. Since the relationship of the height h of the back wall and the height H of the front wall in side view is known from calibration data, the program calculates an adjustment factor based on the depth d of the animal 907 in the arena and the adjustment coefficient, calculated during the calibration procedure. In further side view image analysis, the program adjusts linear parameters of the animal 907 in the side view image by multiplying them by the animal's adjustment factor. The program adjusts area size parameters of the animal 907 in the side view image analysis by multiplying them by the square of the adjustment factor.

The program recalculates the adjustment factor when the animal 907 changes its location. Alternatively, the program can be configured to calculate the adjustment factor for every frame or at predetermined periods of time.

Returning to FIG. 3, in a preferred embodiment, after stereo view integration analysis 270 is completed, the program performs current frame spatial relationships identification 272. In the Current Frame Spatial Relationship Identification module 272, the program determines at least one of spatial relationships between animals in the arena, between body parts of the animals and other animals, between body parts of different animals, between body parts of the same animal, between an animal or group of animals and inanimate objects, between body parts of the animals and inanimate objects, etc. The module 272 determines spatial relationships of the analyzed animals in the arena as a whole and/or their body parts, such as head, mouth, tail, forelimbs, hind limbs, upper back, lower back, and abdomen. The program determines the spatial relationships of the animals and their body parts in relation to the arena, other animals, inanimate objects in the arena, virtual zones in the arena, and the intra relationships of the animals' body parts (i.e. how the body parts of the same animal spatially relate to the other body parts of the same animal, for instance, identifying that the animal's mouth is in contact with this animal's own lower back as in grooming behavior).

The program then performs sequence analysis 274 based on the current frame spatial relationship information obtained by the program module 272. The sequence analysis module 274 tracks the shapes and locations of the desired animals from one frame to another frame and identifies the changes in the shapes, locations, orientations, body parts, and/or postures of the animals. Then, the program uses this information to identify the behaviors as one of a number of pre-defined behaviors, including auto behaviors and social behaviors among multiple animals.

The behavior may be identified using, for example, approaches such as rule-based analysis, token parsing procedure, and/or sequence analysis or state change analysis such as Hidden Markov Modeling (HMM). Further, the system may be constructed to identify the behaviors of animals as new behavior and as having a particular temporal rhythm or circadian rhythm.

In one embodiment, the foreground animals' shapes are classified into various predefined postures stored in the database. Then, groups of postures and body part movement and interaction information are concatenated into a series and compared against the sequence of postures, stored in for example a database in memory, that make up known normal or abnormal behaviors of the animal, to determine the best matching behavior. The abnormal behaviors are then identified in terms of known abnormal behavior, new behavior and/or daily rhythm.

In a preferred embodiment, the program uses rule-based analysis to perform sequence analysis 274 of the data. In rule-based analysis, each behavior can be modeled as a set of rules that must be satisfied. The rules are formulated using any of the available data about the animals, including current frame spatial relationships, such as position and shape of specific body parts with or without respect to other objects or animals, motion characteristics of the entire animal's body or individual body parts, etc. The rules include identifying a certain spatial relationship and determining whether this spatial relationship remains for a certain period of time, or changes at a certain rate in a certain direction. The rules are pre-defined by the system. In a preferred embodiment the rules are customized by the users for a single experiment or a series of experiments.

In another embodiment the program uses token parsing to perform sequence analysis. In token parsing procedure, each token has a corresponding predefined set of conditions. The system generates a token for a video frame. In one embodiment, the system generates a token for each frame. In another embodiment, the system generates tokens for the frames at predetermined time intervals. In another embodiment time intervals may vary from one part of the experiment to another. In another embodiment the intervals may vary based on identified behaviors.

A specific token is generated when the current frame spatial relationships determined for the frame satisfy the predefined conditions specified for the token.

As tokens are generated, they are passed onto a token parser that accepts a series of tokens and when certain patterns of tokens are observed, certain behaviors are detected.

In another embodiment to perform sequence analysis 274 the program uses probabilistic model method. In this method models are built based on transitions from one feature state to another with training samples. These models may then be used to identify behaviors based on the incoming sequence of feature labels. This model can provide significant added accuracy to temporal relationships for proper complex behavior characterization.

In another preferred embodiment the program utilizes a combination of different methods of analysis to perform sequence analysis 274.

Figure 10:
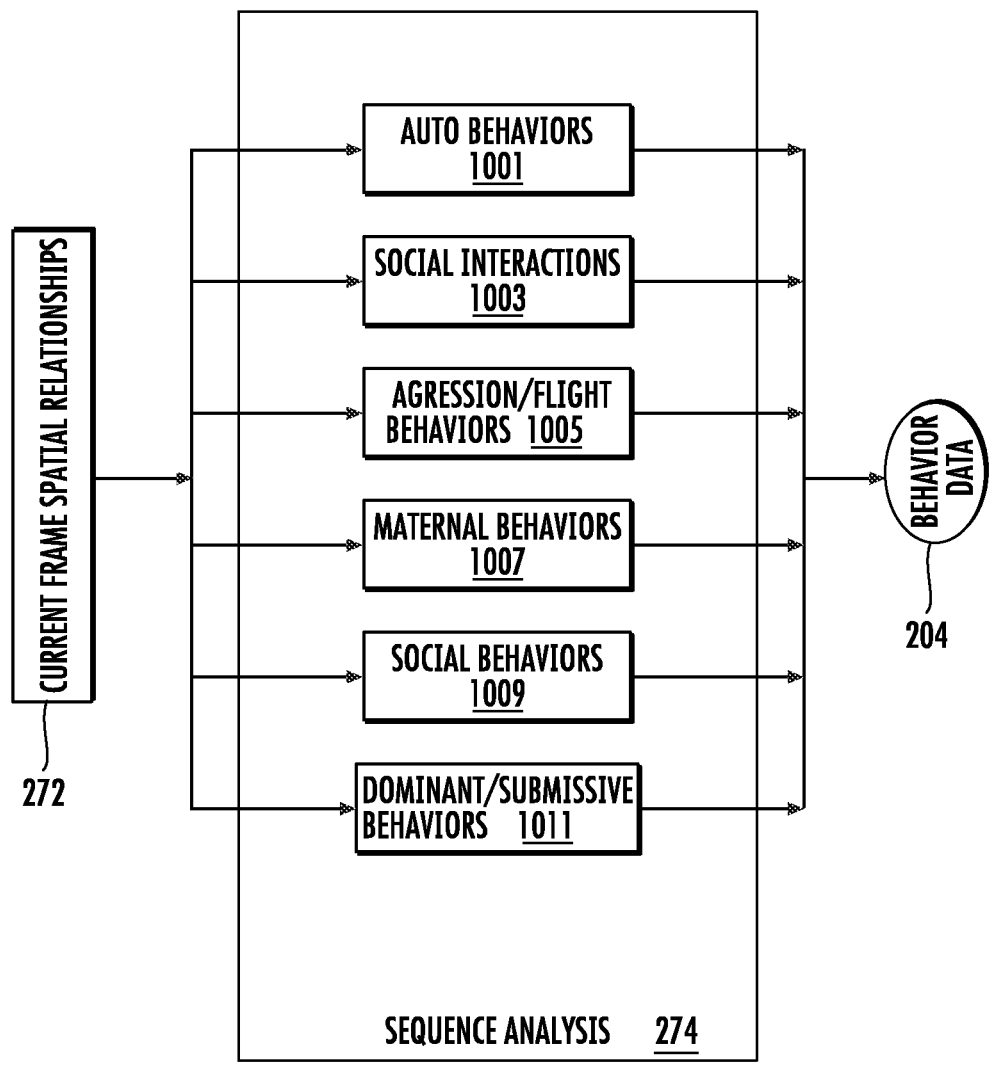
FIG. 10 is a high level flow chart of a preferred sequence analysis module of the present invention.

The system of the present invention is directed to identifying a number of behaviors in multi-animal environment, such as auto and social behaviors, aggression/flight behavior, dominant/submissive behavior, maternal behavior, sexual behavior, etc. In a preferred embodiment, sequence analysis 274 is performed by a set of behavior modules, such as auto behaviors module 1001, social interaction module 1003, aggression/flight behavior module 1005, maternal behavior module 1007, sexual behavior module 1009, and dominant/submissive behavior module 1011. (see FIG. 10) Each individual module is configured to identify a corresponding group of pre-defined behaviors.

In a preferred embodiment, the program is configured to be able to simultaneously run multiple behavior modules. Thereby the system is capable of identifying behaviors from different behavior sets (such as auto behaviors, social behaviors, sexual behaviors, etc.) in a single run. For example, identification of object recognition behaviors and social interaction behaviors of two or more animals can be performed during a single experiment. The users can pre-select which behavior modules to run during an experiment or a series of experiments. The selected modules are executed simultaneously to obtain analysis results of each. This flexibility enhances the throughput and usability of the system.

Below we describe the behavior modules and exemplary behaviors identified by these modules.

Auto Behavior Module

In a preferred embodiment of the invention, the program includes an auto behavior module 1001 configured to identify auto behaviors of living organisms. In preferred embodiment, this module is a part of the sequence analysis module 274. This module receives data from the current frame spatial relationships identification module 272 and outputs its findings to the behavior data module 204.

Auto behaviors are independent behaviors of animals when multiple animals are present but not engaged in social interactions. Auto behaviors are characterized by animals' lack of engagement with other animals, acting as if a single animal in an enclosure, even though, these auto behaviors by one of the animals happen while other animals are present. The examples of normal auto behaviors include eating, chewing, drinking, sleeping, walking, rearing, hanging, jumping, sniffing, grooming, landing, turning, digging, foraging, circling, stretching, twitching, pausing, awakening, urinating, repetitive jumping, etc The auto behaviors may or may not be influenced by other animals present in the same environment. The detection of these auto behaviors provides additional research tool, providing information on the influence of multi-animal environment on single animal behaviors.

Most auto behaviors include rules about position or orientation of the animal or its body parts. The accuracy of identification for such behaviors significantly improves with the use of stereo-view analysis of the present invention. As was discussed above, stereo-view analysis substantially improves reliability of identification of current frame spatial relationships by providing additional set of information about location of an animal and its body parts.

For example, when identifying sniffing behavior, in top-view the program can accurately identify the orientation of the animal towards an object. However, the top-view image cannot provide information about elevation of the animal's nose and whether the nose is at the same elevation as the object. The animal could be close to the object but sniffing up in the air or sniffing the floor. If only the top view image were used, there would be an ambiguity in the program's sniffing behavior identification. However, the side-view image provides additional information: from the side-view image the program can reliably identify what is the elevation of the animal's nose. If the nose of the animal is at the same elevation as the object, the "sniffing of the object" behavior is identified. If the nose of at a different elevation, the program may conclude that the animal was sniffing the floor, or sniffing the air.

Social Interactions Module

Social interactions module 1003 identifies social behaviors directed toward other animals or taking place between members of a group of animals. In a preferred embodiment, this module is also a part of sequence analysis module 274 and receives data from the current frame spatial relationships identification module 272. The social interaction module 1003 also outputs the results of its analysis to the behavior data module 204.

The social interaction events being recognized by the social interaction module 1003 include social recognition, social dysfunction, active and passive social contact, approaching, leaving, following, sniffing at the head of another animal, sniffing at the mid-body of another animal, sniffing at the genital area of another animal. Additionally, this module traces and records the path of movements of each of the animals' center of mass in the arena, calculates for each of the animals instant and average speed of movement and distance traveled, calculates and records for each of the animals its instant and cumulative body turning angles and maps each animal's instant position into user-defined virtual zones.

More complex social behaviors include aggression/flight, maternal behaviors, sexual behaviors, dominant/submissive behaviors, etc. In a preferred embodiment of the present system, these more complex social behaviors are identified by separate specialized modules, such as aggression/submission module 1005, maternity behavior module 1007, sexual behavior module 1009, which are included in sequence analysis module 274 of the system.

As part of the stereo-view integration analysis 270 and the current frame spatial relationship analysis 272, the program determines the spatial relationships between animals present in the arena, spatial relationships between specific body parts of the animals (for instance, what part of the other animal's body is the first animal's nose in contact with?), spatial relationships between body parts of the same animal, spatial relationship between animals and inanimate objects, animals' orientation in relation to each other, etc. This data provides the basis for identification of social behaviors.

In a preferred embodiment, the program uses rule-based analysis to identify the social interaction behaviors. The examples of sets of rules for some social interaction behaviors are provided below. When the program operates with predetermined periods of times, orientations, distances, the deviation thresholds are applied.

Social Contact

Social Contact behavior is determined by detecting physical contact between any two animals. Body Distance is used as the basic detection measure for this behavior. Contact can be further divided into Passive Contact and Active Contact. Passive Contact is unintentional contact, or intentional contact that remains stable for an extended period of time. Active contact is active intentional contact with movements occurring between the two animals constantly. Heading direction and the body part of contact are used for passive and active contact detection.

Active Social Contact

Key Spatial relationships: Distance between the edge of the image of the first animal and the edge of the image of the second animal lesser than a predetermined threshold.

Basic Rules: Key spatial relationship remains for the predetermined length of time. The first animal is in direct contact with the second animal for at least the predetermined portion of the predetermined period of time. The distance between the animals continues to vary during this period.

Passive Social Contact

Key Spatial relationships: Distance between the edge of the image of the first animal and the edge of the image of the second animal lesser than a predetermined threshold.

Basic Rules: Key spatial relationship remains for the predetermined length of time. The distance between the center of mass of the first animal and the center of mass of the second animal remains substantially constant for the predetermined period of time.

Sniff at Another Animal and its Specific Body Parts

Behavior Definition: Sniffing behavior is identified when the mouth of the first animal touches the body of the second animal. The program identifies which part of the second animal's body is being sniffed (head, back, genital area, etc.)

Key Spatial relationships: Distance between the nose of the first animal and the edge of the image of another animal is lesser than a predetermined threshold.

Basic Rules: Spatial relationship remains for a predetermined length of time.

Approach

Behavior Definition: Approach behavior is movement of the first animal towards the second animal, occurring within a specified zone surrounding the second animal.

Key Spatial relationships: The first animal is oriented towards the second animal. The distance between the center of the first animal and the center of the second animal is lesser that a predetermined threshold.

Basic Rules: The distance between the center of the first animal and the center of the second animal remains lesser that a predetermined threshold. The first animal is oriented towards the second animal for a predetermined length of time. The distance between the centers of the first and the second animals decreases where the first animal is moving towards the second animal for at a predetermined period of time.

Leave

Behavior Definition: Leave behavior is defined as the movement behavior of the first animal away from the second animal, occurring within a specified zone surrounding the second animal.

Key Spatial relationships: The first animal is oriented away from the second animal. The distance between the center of the first animal and the center of the second animal is lesser that a predetermined threshold.

Basic Rules: The distance between the center of the first animal and the center of the second animal remains lesser that a predetermined threshold. The first animal is oriented away from the second animal for a predetermined length of time. The distance between the centers of the first and the second animals increases where the first animal is moving away from the second animal for a predetermined period of time.

Follow

Behavior Definition: Follow behavior is movement behavior of the first animal towards the second animal, occurring within a specified zone surrounding the second animal, while the second animal is simultaneously moving away from the first animal.

Key Spatial relationships: The first animal is oriented towards the second animal. The second animal is oriented away from the first animal. The distance between the center of the first animal and the center of the second animal is lesser that a predetermined threshold.

Basic Rules: The distance between the center of the first animal and the center of the second animal remains lesser that a predetermined threshold. The first animal is oriented towards the second animal for a predetermined length of time. The second animal is oriented away from the first animal for a predetermined length of time. The first animal performs Approach behavior during the same time interval as the second animal performs Leave behavior. The relative distances between two animals may fluctuate.

Stare at Another Animal

Behavior Definition: Staring behavior is defined as the still observation of the first animal of the second animal, occurring within a specified zone surrounding the second animal.

Key Spatial relationships: The distance between the center of the first animal and the center of the second animal is lesser than a predetermined threshold. The first animal is oriented towards the second animal.

Basic Rules: The distance between the center of the first animal and the center of the second animal remains lesser that a predetermined threshold. The first animal is oriented towards the second animal for a predetermined period of time. The center of the first animal remains stationary for a predetermined period of time.

Aggression/Flight Behaviors Module

In a preferred embodiment, the program includes an Aggression/Flight behavior analysis module 1005 configured to identify the aggression/flight behaviors of two or more animals in an arena. Aggressive behavior is animal's behavior towards another animal demonstrating intent to harm the other animal. Aggressive behavior patterns consist of temporally and sequentially organized communicative signals, acts and postures with diverse distal, proximal, and triggering antecedents and consequences, each serving different functions. In a preferred embodiment the Aggression/flight module 1005 is configured to identify aggressive behaviors, including threat, thrust, chase, bite, full aggressive, offensive upright, offensive sideways, aggressive grooming, tail rattle and fight; and flight behaviors, including flag, evade, retreat, flee, freeze, crouch, elevated crouch, defensive upright, and defensive sideways. In a preferred embodiment this module 1005 is a part of the sequence analysis module 274, receiving data from the current frame spatial relationships module 272 and forwarding the findings to the behavior data module 204.

In a preferred embodiment, the program uses rule-based analysis to identify the aggression/flight behaviors. The examples of sets of rules for some aggression/flight behaviors are provided below. When the program operates with predetermined periods of times, orientations, distances, the deviation thresholds are applied.

Threat

Behavior Definition: Threat is the act of the aggressor rapidly thrusting its head towards the opponent.

Key Spatial relationships: The aggressor is oriented toward the opponent. The distance between the center of mass of the opponent and the center of mass of the aggressor is less that the predetermined distance.

Basic Rules: The head of the aggressor moves at least at the predetermined speed and for the second predetermined distance towards the opponent. The center of mass of the aggressor does not move more than the third predetermined distance.

Thrust

Behavior Definition: Thrust is the act of the aggressor rapidly moving its forebody towards the opponent. Thrust may induce contact of the aggressor's forebody with the opponent's body. The aggressor's head is not in contact with the opponent's body.

Key Spatial Relationships: The distance between the center of mass of the opponent and the center of mass of the aggressor is less that the predetermined distance.

Basic Rules: The aggressor's forebody moves at least at the predetermined speed for the predetermined amplitude towards the opponent.

Chase

Behavior Definition: Chase is the act of rapid following of the opponent by the aggressor, where the opponent is rapidly fleeing the aggressor.

Key Spatial Relationships: The aggressor is oriented towards the opponent. The distance between the center of mass of the opponent and the center of mass of the aggressor is less that the first predetermined distance.

Basic Rules: The aggressor moves at least at the predetermined speed towards the opponent for the second predetermined distance. The opponent is moving away from the aggressor at the predetermined speed for the third predetermined distance. The path of the aggressor closely repeats the path of the opponent.

Bite

Behavior Definition: Bite is the act where the aggressor performs a threat and thrust towards the opponent ending in mouth contact with the opponent's body.

Key Spatial Relationships:

First set: The aggressor is oriented towards the opponent. The distance between the center of mass of the opponent and the center of mass of the aggressor is less that the first predetermined distance. The aggressor's mouth is not in contact with the opponent.

Second set: The aggressor's mouth is in contact with the opponent's body.

Basic Rules: The aggressor moves from the first set of spatial relationships to the second set of spatial relationships at the predetermined speed.

Fully Aggressive Behavior

Behavior Definition: Fully Aggressive behavior is an act where the aggressor exhibits a posture during a momentary pause in fighting where the animal stands at the side of the supine opponent with its forepaws resting on the opponent's abdomen.

Key Spatial Relationships: The opponent is lying on its back. The aggressor rears over the opponent. The aggressor's forepaws are in contact with the opponent's abdomen.

Basic Rules: The fight behavior is observed. The opponent is lying on its back for the predetermined period of time. The aggressor rears over the opponent for the predetermined period of time. The aggressor's forepaws are in contact with the opponent's abdomen for the predetermined period of time. The aggressor remains in substantially the same posture for the predetermined period of time.

Offensive Upright

Behavior Definition: Offensive upright behavior is an act where the aggressor exhibits a posture of bipedal stance with back hunched, head and body oriented and leaning towards opponent, eyes slitted and ears flattened.

Key Spatial Relationships: The aggressor is in a reared or partially reared posture. The aggressor's back is curved outwards. The aggressor is oriented toward the opponent. The aggressor's upper body axis is leaning toward the opponent. The aggressor's eyes are partially closed.

Basic Rules: The aggressor remains in the above-identified spatial relationship for the predetermined period of time.

Offensive Sideways

Behavior Definition: Offensive sideways is an act where the aggressor remains against the side of the opponent with the aggressor's body presented laterally to the opponent and rotated away from the opponent, head oriented towards opponent with eyes slitted and ears flattened.

Key Spatial Relationships: The distance between the center of mass of the aggressor and the center of mass of the opponent is less that the predetermined distance. The aggressor is in laying posture. The aggressor's head is oriented towards the opponent. The aggressor's ears are flattened. The aggressor's eyes are partially closed.

Basic Rules: The aggressor remains in the above-identified spatial relationship for the predetermined period of time.

Aggressive Grooming

Behavior Definition: Aggressive groom is vigorous tugging of opponent's fur, generally in the back, or shoulder region.

Key Spatial Relationships: The aggressor's mouth or head limbs are in contact with the back or shoulder region of the opponent's body.

Basic Rules: The head of the aggressor moves back and forth at predetermined speed with predetermined amplitude for predetermined period of time repetitively.

Tail Rattle

Behavior Definition: Tail Rattle is rapid lashing of the aggressor's tail from side to side. It produces rattle when solid object (e.g. cage wall) is struck.

Key Spatial Relationships: The aggressor may be in any posture.

Basic Rules: The tail of the aggressor moves laterally back and forth at predetermined speed with predetermined amplitude for predetermined period of time repetitively.

Fight

Behavior Definition: Fight is defined as the act where animals roll around floor biting, kicking, and wrestling, with their bodies clasped together. In some cases, both animals may be in an upright posture facing each other. Their forepaws may touch each other.

Key Spatial Relationships: The aggressor's body and the opponent's body are in close contact.

Basic Rules: The aggressor and the opponent remain in close contact for at least a predetermined period of time. The aggressor and the opponent move at the predetermined speed for this predetermined period of time.

Flag

Behavior Definition: Flag is the opponent performing a sharp movement of its head away from the aggressor.

Key Spatial Relationships: The distance between the center of mass of the opponent and the center of mass of the aggressor are less than the predetermined distance.

Basic Rules: The head of the opponent moves at the predetermined speed away from the aggressor. The center of mass of the opponent's body remains substantially stationary for the predetermined period of time.

Evade

Behavior Definition: Evading is a sharp movement of the fore body of the opponent away from the aggressor.

Key Spatial Relationships: The distance between the center of mass of the opponent and the center of mass of the aggressor are less than the predetermined distance.

Basic Rules: The fore body of the opponent moves at the predetermined speed away from the aggressor. The center of mass of the opponent's body remains substantially stationary for the predetermined period of time.

Retreat

Behavior Definition: Retreat is the opponent's movement directly away from the aggressor at a walking pace.

Key Spatial Relationships: The distance between the center of mass of the opponent and the center of mass of the aggressor are less than the predetermined distance. The opponent's body is oriented away from the aggressor.

Basic Rules: The opponent is oriented away from the aggressor for the predetermined period of time. The opponent is moving away from the aggressor at the predetermined speed for the predetermined period of time. The path of the opponent is substantially straight.

Flee

Behavior Definition: Flee the opponent's rapid movement directly away from the aggressor.

Key Spatial Relationships: The distance between the center of mass of the opponent and the center of mass of the aggressor are less than the predetermined distance. The opponent's body is oriented away from the aggressor.

Basic Rules: The opponent is oriented away from the aggressor for the predetermined period of time. The opponent is moving away from the aggressor at the predetermined speed for the predetermined period of time. The path of the opponent is substantially straight.

Freeze

Behavior Definition: Freeze is the state of the opponent's body remaining motionless for a period of time.

Key Spatial Relationships: The entire body of the opponent remains immobile.

Basic Rules: The opponent remaining immobile for the predetermined period of time.

Crouch

Behavior Definition: Crouch is the posture where the opponent's body is held close to the ground with its back hunched and legs flexed, remaining relatively immobile but may show slight scanning movements of its head.

Key Spatial Relationships: The opponent's body is close to the ground. The opponent's back hunched. The opponent's legs flexed.

Basic Rules: The opponent remains in the above-identified spatial relationships position for the predetermined period of time. The opponent remains substantially immobile for the predetermined period of time, except that the opponent's head may move within the predetermined amplitude at the predetermined speed from side to side.

Elevated Crouch

Behavior Definition: Elevated crouch is the posture where the opponent's body is held close to the ground with its back hunched and its fore legs extended, remaining relatively immobile but may show slight scanning movements of its head.

Key Spatial Relationships: The opponent's body is close to the ground. The opponent's back hunched. The opponent's legs extended.

Basic Rules: The opponent remains in the above-identified spatial relationships position for the predetermined period of time. The opponent remains substantially immobile for the predetermined period of time, except that the opponent's head may move within the predetermined amplitude at the predetermined speed from side to side.

Full Submissive

Behavior Definition: Full Submissive the behavior where the opponent lies flat on its back.

Key Spatial Relationships: The opponent lies flat on its back.

Basic Rules: The opponent lies flat on its back for the predetermined period of time.

Defensive Upright

Behavior Definition: Defensive upright behavior is where the opponent is in a bipedal stance facing aggressor, with eyes open, ears extended, head oriented upwards, especially when the aggressor is in close proximity to the opponent.

Key Spatial Relationships: The distance between the center of mass of the aggressor and the center of mass of the opponent is less than the predetermined distance. The opponent is in upright position. The opponent is oriented toward the aggressor. The opponent's eyes are open. The opponent's ears are extended. The opponent's head is oriented upwards.

Basic Rules: The opponent remains in the above-identified spatial relationship set for the predetermined period of time. The opponent is substantially stationary for the predetermined period of time.

Defensive Sideways

Behavior Definition: Defensive sideways behavior is where the opponent lying down and is in a lateral orientation to the aggressor, with the opponent's eyes open, ears extended, body rotated away from the aggressor, forepaw closer to the aggressor may be raised and not touching the floor of the arena, and the head oriented away from the aggressor, especially when the aggressor is in close proximity.

Key Spatial Relationships: The distance between the center of mass of the aggressor and the center of mass of the opponent is less than the predetermined distance. The opponent is lying horizontally. The opponent is laterally oriented towards the aggressor. The opponent's eyes are open. The opponent's ears are extended. The opponent's head is oriented away from the aggressor.

Basic Rules: The opponent remains in the above-identified spatial relationship for the predetermined period of time. The opponent's body rotates. The opponent is moving away from the aggressor.

Dominant/Submissive Behaviors Module

Dominant/submissive behavior module 1011 automatically determines the dominant submissive behavior of two or more animals in an arena. In a preferred embodiment this module is a part of the sequence analysis module 274, receiving data from the current frame spatial relationships module 272 and forwarding the findings to the behavior data module 204.

Figure 11:
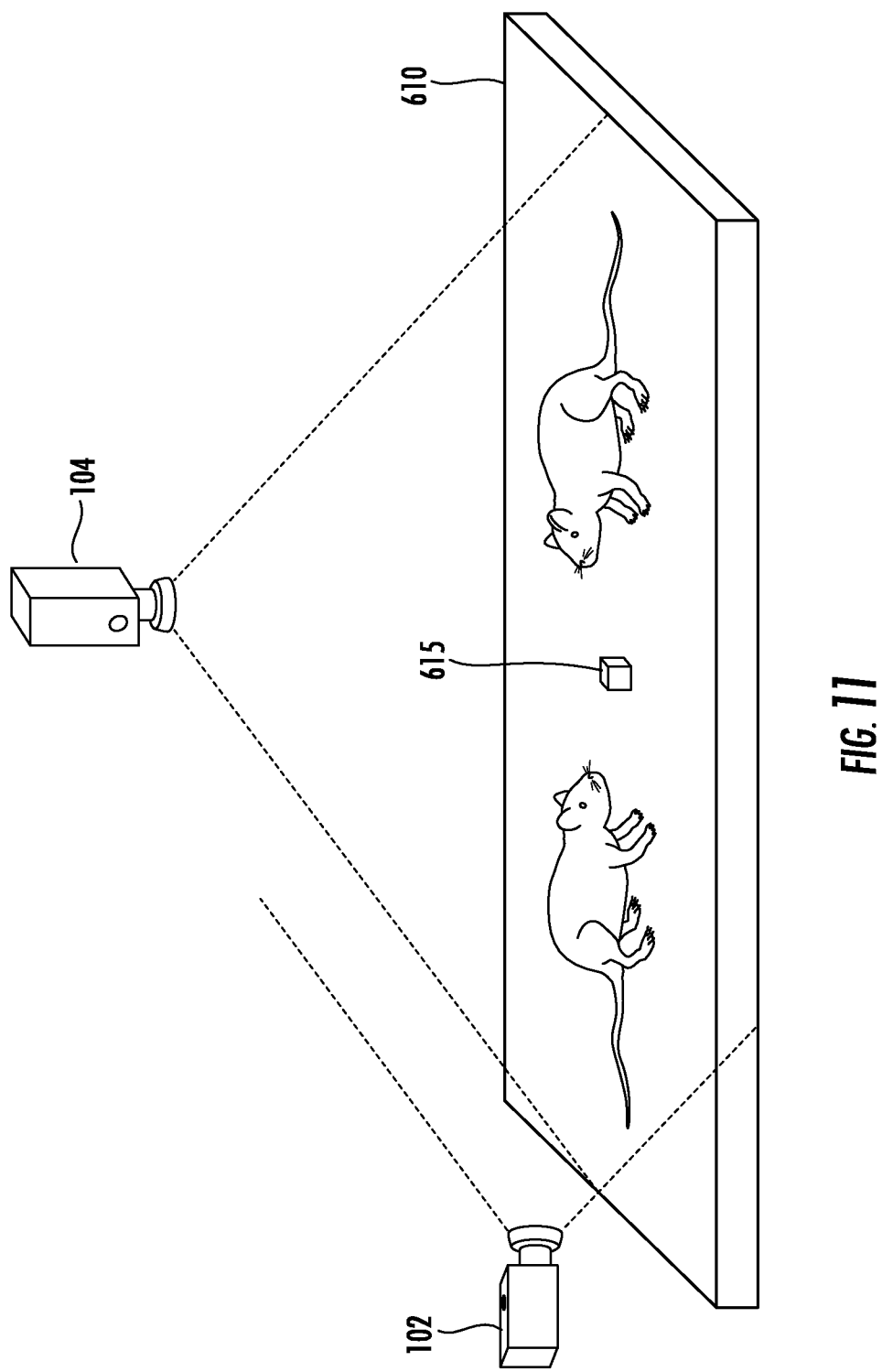
FIG. 11 a diagrammatic representation of a preferred stereo-view multiple animal arena, configured for dominant/submissive behavior analysis.

Referring to FIG. 11, in a preferred embodiment, an arena 610 to study dominant/submissive behavior includes a commonly accessible reward 615 placed in the arena 610. In addition to identifying dominant/submissive behaviors, the module 1011 also records the amount of time that each of the animals spend at the reward 615. The measure of dominance is directly inferred from the amount of time that each animal spends at the reward and the distance between the animals, and the distance between the animal and reward, over the course of the experiment.

In addition to measuring a number of parameters of the animals' contact with the reward 615, the dominant/submissive module 1011 is configured to identify many of the behaviors listed above in the description of the Aggression/Flight Behavior module 1005. However, the Dominant/Submissive Behavior Module 1011 may include behaviors not included in the list of behaviors identified by the Aggression/Flight Behavior module 1005.

Maternal Behavior Module

Maternal behavior module 1007 automatically determines the maternal behavior of a mother with its offspring in an arena. In a preferred embodiment, in this module the program usually identifies how a mother takes care of her offspring after giving birth to them, preferably in a home cage environment. In a preferred embodiment the maternal behaviors identified by this module includes Retrieve Pup, Nurse Pup, Lick and Groom-Pup, On Nest, Off Nest, Scattered Pups, Transport Pups, Arch-back Nurse Pup, Prone-nurse Pup, and Build Nest, etc. In a preferred embodiment this module is a part of the sequence analysis module 274, receiving data from the current frame spatial relationships module 272 and forwarding the findings to the behavior data module 204.

During early maternal behavior experiments, the pups are too young to move, and each of the pups (or the whole litter) can be considered as an inanimate object, and the maternal behavior module 1007 can utilize the standard object recognition methods as, where the pups are now the objects.

In a preferred embodiment, the program uses rule-based analysis to identify the maternal behaviors. The examples of sets of rules for some maternal behaviors are provided below. When the program operates with predetermined periods of times, orientations, distances, the deviation thresholds are applied.

Retrieve Offspring

Behavior Definition: Offspring-retrieval behavior is defined as the act of grasping an offspring by the mother with her mouth and moving the offspring from the first location to the nest.

Key Spatial Relationships: Mother's mouth in contact with the offspring, the offspring is at least the predetermined distance away from the predetermined nest zone.

Basic Rules: Mother's mouth in contact with the offspring for the predetermined period of time. The offspring moves toward the predetermined nest zone.

Lick and Groom-Offspring

Behavior Definition: Licking and grooming behavior is defined as the act of using the mouth to lick and groom the offspring.

Key Spatial Relationships: Mother's mouth in contact with the offspring.

Basic Rules: Mother's mouth in contact with the offspring for a predetermined period of time. There can be bobbing movements of the mother's head.

Nurse-Offspring

Behavior Definition: Nursing behavior is defined as the act of providing milk to the offspring and is detected by observing the offspring attached to the abdomen of the mother animal Key Spatial Relationships: The mouth of the offspring in contact with the abdomen of the mother.

Basic Rules: The mouth of the offspring in contact with the abdomen of the mother for a predetermined period of time.

On Nest

Behavior Definition: On Nest is defined as the mother spends time on the nest with the offspring. (When mother is on the nest, she provides warmth and comfort to the offspring instead of leaving them exposed).

Key Spatial Relationships: Mother animal's center of mass lies within the defined Nest zone.

Basic Rules: Mother animal's center of mass remains within the defined Nest zone for a predetermined period of time.

Off Nest

Behavior Definition: Off Nest is defined as the mother spends time out of the nest. When this occurs, the nest with the offspring will be visible clearly.

Key Spatial Relationships: Mother animal's entire body is outside of the predetermined Nest zone.

Basic Rules: Mother animal's entire body is outside of the predetermined Nest zone for the predetermined period of time.

Scattered Offspring

Behavior Definition: Scattered Offspring is defined as when the offspring are not in the predetermined nest zone.

Key Spatial Relationships: At least the predetermined number of offspring is located outside the predetermined nest zone.

Basic Rules: At least the predetermined number of offspring is located outside the predetermined nest zone for a predetermined period of time.

Transport Offspring

Behavior Definition: Transporting offspring behavior is defined as the act of grasping an offspring by the mother with her mouth and moving the offspring from the first location to the second location, where the second location is outside the predetermined nest zone.

Key Spatial Relationships: Mother's mouth is in contact with the offspring, the offspring is at least the predetermined distance away from the predetermined nest zone.

Basic Rules: Mother's mouth is in contact with the offspring for the predetermined period of time. The offspring moves from the first location to the second location, where the distance between the first and the second location is at least above the predetermined threshold and the second location is outside the predetermined nest zone.

Arch-back Nurse Offspring

Behavior Definition: Arch-back nurse is defined as the act of mother nursing offspring while lying on the floor with its back curved.

Key Spatial Relationships: Mouth of the offspring is in contact with the abdomen of the mother. Mother is on top of the offspring. Mother's back is curved.

Basic Rules: Mouth of the offspring is in contact with the abdomen of the mother; mother is on top of the offspring; mother's back is curved for a predetermined period of time.

Prone Nurse Offspring

Behavior Definition: Prone nurse is defined as the act of mother nursing offspring while lying on the floor with its back straight.

Key Spatial Relationships: Mouth of the offspring is in contact with the abdomen of the mother. Mother is on top of the offspring. Mother's back is straight.

Basic Rules: Mouth of the offspring is in contact with the abdomen of the mother; mother is on top of the offspring; mother's back is straight for a predetermined period of time.

Build Nest

Behavior Definition: Build Nest is defined as the act of moving the bedding around to create a comfortable area in the arena for the offspring Key Spatial Relationships: Mother's mouth in contact with pieces of bedding. OR Mother's paws in contact with pieces of bedding Basic Rules: Mother's mouth in contact with the pieces of bedding for the predetermined periods of time. The pieces of the bedding move from their original location to a nest zone. OR Mother's paws in contact with the pieces bedding for the predetermined period of time. The pieces of bedding move from their original location to the nest zone.

Sexual Behavior Module

Sexual behavior module 1009 automatically determines the sexual behavior of male and female animals in the arena. In a preferred embodiment, the sexual behaviors identified by this module includes approaching from behind, male mounting on a female, female exhibiting a lordotic posture, male thrusts, and ejaculation, etc. In a preferred embodiment this module is a part of the sequence analysis module 274, receiving data from the current frame spatial relationships module 272 and forwarding the findings to the behavior data module 204.

Figure 12:
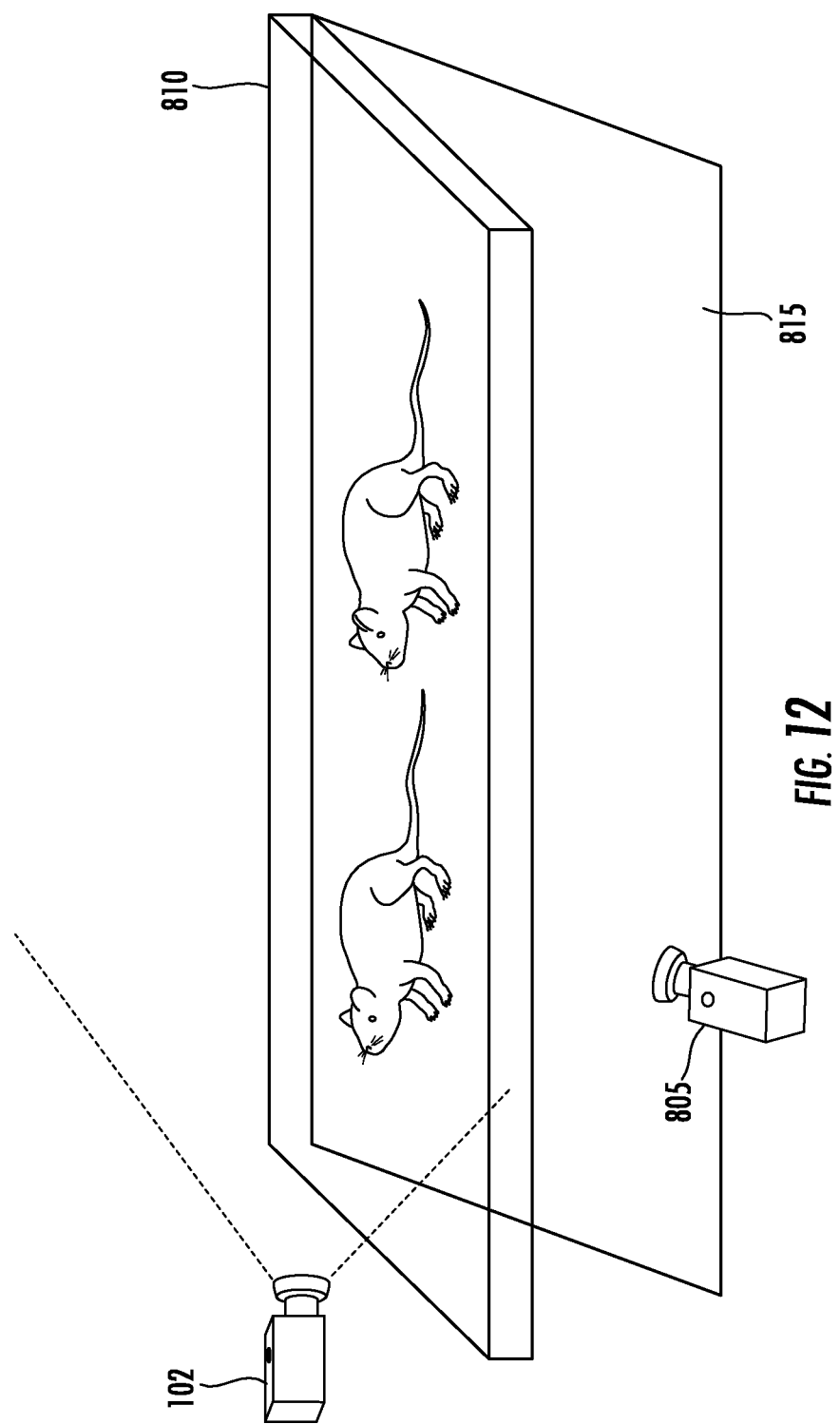
FIG. 12 a diagrammatic representation of a preferred stereo-view multiple animal arena, configured sexual behavior analysis.

When the system is configured to identify sexual behaviors, in a preferred embodiment the system obtains bottom view of an arena as one of the multiple views to be analyzed. An example apparatus with an arena suitable for observation of sexual behaviors is shown in FIG. 12, where the arena 810 has a mirror 815 underneath to reflect a ventral view of the animals to the side. Camera 805 is placed directly on the front and captures images of the bottom of the arena.

In a preferred embodiment, the program uses rule-based analysis to identify sexual behaviors. The examples of sets of rules for some sexual behaviors are provided below. When the program operates with predetermined periods of times, orientations, distances, the deviation thresholds are applied.

Hop

Behavior Definition: Hop is defined as the act of jumping, usually brief, low in height and may occur in succession. Hops may happen directly from the horizontal position.

Key spatial relationships:

First set: the animal is in full contact with the floor of the arena.

Second set: the animal is in the air without any contact with the floor of the arena.

Basic Rules: The animal is in the first spatial relationship for a predetermined period of time, then moving at a predetermined speed into the second spatial relationship, and then again into the first spatial relationship. The body distortion of the animal does not change more than by the predetermined amount.

Dart

Behavior Definition: Dart is the act of quick lateral movement of locomotion usually starting from a stationary period to another location and remaining stationary there afterwards.

Key Spatial relationships: any horizontal position of an animal.

Basic Rules: The animal remains in the same stationary position for a predetermined period of time, and then the animal changes its position laterally to a second position, where the speed of the animal's movement is within the predetermined parameters. The animal stays stationary at the second position for a second predetermined period of time.

Ear Wiggle

Behavior Definition: Ear Wiggle is the act of quick twitch-like movements of the ear in succession.

Key Spatial relationships: The animal can be in any position or posture

Basic Rules: The animal's center of mass remains substantially stationary. The animal's ears change position within predetermined amplitude, at a predetermined speed, in succession, and for a predetermined period of time.

Lordosis

Behavior Definition: Lordosis is defined as the act of posturing by the female indicating receptiveness. The posture exhibited involves having the back arched concavely with the head and the rump elevated, back feet extended, and the tail deflected to one side.

Key Spatial relationships: A female has her back arched concavely with head and rump elevated to the predetermined level in relationship to the back, back feet extended and tail deflected to the side to the predetermined level.

Basic Rules: A female remains in the above-identified spatial relationship for the predetermined period of time.

Chase

Behavior Definition: Chase is the act of one animal following another animal at high speed as this other animal moves around the arena.

Key Spatial relationships: The first animal oriented towards the second animal. The second animal oriented away from the first animal.

Basic Rules: The first animal oriented towards the second animal moving toward the second animal at a predetermined speed for a predetermined period of time and for a predetermined distance. The second animal oriented away from the first animal, moving away from the second animal at a predetermined speed, for a predetermined period of time and for a predetermined distance, where the path of the first animal is substantially the same as the path of the second animal.

Grooming

Behavior Definition: Grooming is the act of animal using its head, mouth or limbs to rub the other animal.

Key Spatial relationships: The first animal's head, mouth or limb in contact with the second animal.

Basic Rules: The first animal's head, mouth or limb remains in contact with the second animal for the predetermined period of time. The first animal's head or mouth or limb is moving back and forth at predetermined amplitude and predetermined speed for a predetermined period of time.

Sniffing Genital Area

Behavior Definition: Sniffing Genital Area behavior is the touching of the mouth of the first animal against the genital area of the second animal.

Key Spatial relationships: The distance between the nose of the first animal and the edge of the image of genital area of the second animal is lesser than a predetermined threshold.

Basic Rules: The distance between the nose of the first animal and the edge of the image of the genital area of the second animal is lesser than a predetermined threshold for the predetermined period of time.

Mount

Behavior Definition: Mount is the action of the male approaching the female from behind while the female is exhibiting a Lordosis posture.

Key spatial relationships:

First set: The female is in Lordosis posture. The male is located behind the female oriented toward the genital area of the female.

Second set: The female is in Lordosis posture. The male is located on top of the female with its forelimbs wrapped around the female's torso.

Basic Rules: The female is in lordosis posture for the predetermined period of time. The male is in the first spatial relationship for the second predetermined period of time. The male moves from the first to the second spatial relationship within the third predetermined period of time.

Single Thrust

Behavior Definition: Thrust is the singular action of the male moving its hind quarters towards the female so as to thrust its penis inside the female, without regard to whether actual penetration is achieved. The trust behavior is usually repetitive.

Key Spatial relationships: The female is in lordosis posture. The male is on top of the female oriented the same direction as the female, usually with the male's front limbs wrapped around the female's torso.

Basic Rules: The female is in lordosis posture for the first predetermined period of time. The male is on top of the female oriented the same direction as the female, usually with the male's front limbs wrapped around the female's torso, for the predetermined period of time. The male moves its hind quarters towards female with predetermined amplitude and the predetermined speed.

Intromission

Behavior Definition: Intromission is the singular action of the male moving its hind quarters towards the female so as to thrust its penis inside the female's vagina.

Key Spatial relationships: The female is in lordosis posture. The male is on top of the female oriented the same direction as the female, usually with the male's front limbs wrapped around the female's torso.

Basic Rules: The female is in lordosis posture for the first predetermined period of time. The male is on top of the female oriented the same direction as the female, usually with the male's front limbs wrapped around the female's torso for the predetermined period of time. The male's hind quarters moving towards female. The male's penis penetrating inside the female's vagina.

Ejaculate

Behavior Definition: Ejaculate is the culmination behavior of a series of thrusts.

Key spatial relationships:

First set: The female is in lordosis posture. The male is on top of the female oriented the same direction as the female, usually with the male's front limbs wrapped around the female's torso.

Second set: The male not in contact with the female. The male's mouth in contact with the male's penis.

Basic Rules: The male and female animals change from the first spatial relationships to the second spatial relationships within the predetermined period of time. The male's mouth is in contact with its penis for the predetermined amount of time. The male's mouth moves at the predetermined amplitude with the predetermined speed.

Some of the animal behaviors may be interpreted differently by different behavior identification modules. For instance the same behavior may be identified by Social Interaction module 1003 as active contact and by Aggression/Flight module 1005 as fighting. If multiple modules are run on the same segment of video, the same behavior can get multiple identifications by different modules.

Also, some behaviors are identified by multiple modules. For instance, many behaviors identified by the Aggression/Flight module 1005 are also identified by the Dominant/Submissive module 1011. The examples are Threat behavior, Thrust behavior, Chase behavior, etc. When both of these modules 1005 and 1011 are used to identify behaviors in the same video segment, only one of the modules identifies the behaviors from the overlap of the two behavior groups.

All publications, patents, and patent applications cited herein are hereby incorporated by reference in their entirety for all purposes.

Although particular embodiments of the present invention have been shown and described, it will be understood that it is not intended to limit the invention to a preferred or disclosed embodiments, and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims.

We claim:

1. A behavior analysis system, comprising:
    an arena;
    at least a first camera and a second camera, said first camera positioned to capture images of the arena from a first view, and said second camera positioned to capture images of the arena from a second view, the first view being different from the second view;
    a database containing definitions of behaviors of living organisms;
    a computer coupled to the first camera, the second camera and the database;
    said computer comprising memory storing a computer program;
    said computer program configures the computer to receive as an input at least the first view images and the second view images;
    said computer program including a behavior analysis module;
    said behavior analysis module configured to:
        identify at least first view objects from the first view images and second view objects from the second view images;
        determine at least a first living organism and a second living organism using the first view objects and the second view objects;
        determine at least one spatial relationship over time between the first living organism and the second living organism based on stereo-view analysis of spatial relationships between the first living organism and the second living organism from the first view images and the second view images; and
        identify which of the behaviors stored in the database correspond to the at least one spatial relationship over time between the first living organism and the second living organism.

2. The system of claim 1 wherein the first view is from the top of the arena and the second view is from the side of the arena.

3. The system of claim 1 wherein the first view is from the bottom of the arena and the second view is from the side of the arena.

4. The system of claim 1 wherein the computer program further comprises:
    a design module to facilitate design of experiment;
    an execute module to execute the experiment; and
    a review and process module to facilitate review of the output of the behavior analysis module; and
    wherein the first view images and the second view images are captured during the experiment.

5. The system of claim 1 wherein said behavior analysis module is further configured to determine the first view living organisms using the first view objects and determine the second view living organisms using the first view living organisms and the second view objects.

6. The system of claim 1 wherein said behavior analysis module is further configured to determine the spatial relationships over time between at least the first living organism and the other parts of the arena.

7. The system of claim 1 wherein the behavior analysis module is further configured to use an inter-view matching procedure to determine at least the first living organism and the second living organism from the first view objects and the second view objects.

8. The system of claim 1 wherein the behavior analysis module is further configured to determine connected second view objects and perform connected object segmentation of the connected second view objects using the first view living organisms.

9. The system of claim 1 wherein the behavior analysis module is further configured to perform animal size normalization on the second view living organisms using the first view living organisms.

10. The system of claim 1 wherein the identification of the behaviors is performed using probabilistic approach.

11. The system of claim 1 wherein the identification of the behaviors is performed using deterministic approach.

12. The system of claim 1 wherein the identification of the behaviors is performed using at least one of the methods selected from the group consisting of rule-based analysis, token parsing procedure, sequence analysis, state change analysis and Hidden Markov Modeling.

13. The system of claim 1, wherein the behavior analysis module is configured to identify at least one of the behaviors selected from the group consisting of active social contact behavior, passive social contact behavior, sniff at another animal and its specific body parts behavior, approach behavior, leave behavior, follow behavior, and stare at another animal behavior.

14. The system of claim 1, wherein the behavior analysis module is configured to identify at least one of the behaviors selected from the group consisting of threat behavior, thrust behavior, chase behavior, bite behavior, fully aggressive behavior, offensive upright behavior, offensive sideways behavior, aggressive grooming behavior, tail rattle behavior, fight behavior, flag behavior, evade behavior, retreat behavior, flee behavior, freeze behavior, crouch behavior, elevated crouch behavior, full submissive behavior, defensive upright behavior, and defensive sideways behavior.

15. The system of claim 1, wherein the behavior analysis module is configured to identify dominant/submissive behaviors using the living organisms' interactions with a reward.

16. The system of claim 1, wherein the behavior analysis module is configured to identify at least one of the behaviors selected from the group consisting of retrieve offspring behavior, lick and groom offspring behavior, nurse offspring behavior, on nest behavior, off nest behavior, scattered offspring behavior, transport offspring behavior, arch-back nurse offspring behavior, prone nurse offspring behavior, and build nest behavior.

17. The system of claim 1, wherein the behavior analysis module is configured to identify at least one of the behaviors selected from the group consisting of hop behavior, dart behavior, ear wiggle behavior, lordosis behavior, chase behavior, grooming behavior, sniffing genital area behavior, mount behavior, single trust behavior, intromission behavior, and ejaculate behavior.

18. The system of claim 1 wherein the computer program configures the computer to divide the arena into virtual zones.

19. The system of claim 1, wherein the living organisms are animals.

20. The system of claim 19, wherein the animals are mice.

21. The system of claim 19, wherein the animals are rats.

22. The system of claim 19, wherein the animals are a combination of mice and rats.

23. The system of claim 1, wherein the first view objects and the second view objects include body parts.

24. The system of claim 23, wherein the body parts include at least one of the body parts selected from the group consisting of a head, a tail, a waist, a fore body, a hind body, hind limbs, forelimbs, upper back, lower back, abdomen, feet, mouth, and nose.

25. The system of claim 1, wherein the images are captured under various types of light conditions including visible, colored, sodium and infra-red light.

26. The system of claim 1 further comprising:
a second arena; and
a third camera and a fourth camera, said third camera positioned to capture images of the second arena from a third view, and said fourth camera positioned to captured images of the second arena from a fourth view; and wherein:
the computer is further coupled to the third camera and the fourth camera;
the computer program configures the computer to receive as an input at least the third view images and the fourth view images;
said behavior analysis module further configured to:
identify at least third view objects from the third view images and fourth view objects from the fourth view images;
determine second arena living organisms from the third view objects and the fourth view objects;
determine at least one spatial relationship over time for at least one of the second arena living organisms; and
identify which of the behaviors stored in the database correspond to the spatial relationships over time of at least one of the second arena living organisms.

27. The system of claim 1 further comprising a multiplexer wherein at least the first camera and the second camera are coupled to the computer by the multiplexer.

28. The system of claim 1 wherein the behavior analysis module is further configured to determine at least the first living organism and the second living organism using information about the living organisms.

29. The system of claim 1 wherein the behavior analysis module is further configured to convert the images from analog to digital format if the images are captured in analog format.

30. The system of claim 1 wherein the spatial relationships comprise spatial relationships between the first living organism and the second living organism.

31. The system of claim 1 wherein the spatial relationships comprise spatial relationships between body parts of the first living organism and the second living organism.

32. The system of claim 1 wherein the spatial relationships comprise spatial relationships between body parts of the first living organism and body parts of the second living organism.

33. The system of claim 1 wherein the spatial relationships comprise spatial relationships between the first living organism and inanimate objects.

34. The system of claim 1 wherein the spatial relationships comprise spatial relationships between body parts of the first living organism and inanimate objects.

35. A behavior analysis system, comprising:
a database containing definitions of behaviors of living organisms; and
a computer coupled to the database said computer comprising a memory storing a computer program that configures the computer to receive as an input at least a first view image of an arena from a first view and a second view image of the arena from a second view, where the first view is different from the second view;
said computer program comprising:
a behavior analysis module configured to:
identify at least first view objects from the first view image and second view objects from the second view image;
determine at least a first living organism and a second object from the first view objects and the second view objects;
perform stereo-view analysis to determine:
a first spatial relationship between the first living organism and the second object from the first view image of the arena from the first view; and
a second spatial relationship between the first living organism and the second object from the second view image of the arena from the second view;
determine a spatial relationship over time between the first living organism and the second object based at least in part on the stereo-view analysis; and
identify which of the behaviors stored in the database correspond to the spatial relationship over time between the first living organism and the second object.

36. The system of claim 35 wherein the computer program further comprises:
a design module to facilitate design of experiment;
an execute module to execute the experiment; and
a review and process module to facilitate review of the output of the behavior analysis module; and
wherein the first view image and the second view image are captured during the experiment.

37. The system of claim 35 wherein the second object is a second living organism.

38. The system of claim 37 wherein the behavior analysis module is further configured to use an inter-view matching procedure to determine the first living organism and the second living organism from each of the first view objects and the second view objects.

39. The system of claim 37 wherein the behavior analysis module is further configured to determine connected second view objects and perform connected object segmentation of the connected second view objects using the first view objects.

40. The system of claim 37 wherein the behavior analysis module is further configured to perform animal size normalization on the second view objects using the first view objects.

41. The system of claim 37 wherein the identification of the behaviors is performed using probabilistic approach.

42. The system of claim 37 wherein the identification of the behaviors is performed using deterministic approach.

43. The system of claim 37 wherein the identification of the behaviors is performed using at least one of the methods selected from the group consisting of rule-based analysis, token parsing procedure, sequence analysis, state change analysis and Hidden Markov Modeling.

44. The system of claim 37 wherein the behavior analysis module is configured to identify at least one of the behaviors selected from the group consisting of active social contact behavior, passive social contact behavior, sniff at another animal and its specific body parts behavior, approach behavior, leave behavior, follow behavior, and stare at another animal behavior.

45. The system of claim 37 wherein the behavior analysis module is configured to identify at least one of the behaviors selected from the group consisting of threat behavior, thrust behavior, chase behavior, bite behavior, fully aggressive behavior, offensive upright behavior, offensive sideways behavior, aggressive grooming behavior, tail rattle behavior, fight behavior, flag behavior, evade behavior, retreat behavior, flee behavior, freeze behavior, crouch behavior, elevated crouch behavior, full submissive behavior, defensive upright behavior, and defensive sideways behavior.

46. The system of claim 37 wherein the behavior analysis module is configured to identify dominant/submissive behaviors using the living organisms' interactions with a reward.

47. The system of claim 37 wherein the behavior analysis module is at least one of the behaviors selected from the group consisting of retrieve offspring behavior, lick and groom offspring behavior, nurse offspring behavior, on nest behavior, off nest behavior, scattered offspring behavior, transport offspring behavior, arch-back nurse offspring behavior, prone nurse offspring behavior, and build nest behavior.

48. The system of claim 37 wherein the behavior analysis module is configured to identify at least one of the behaviors selected from the group consisting of hop behavior, dart behavior, ear wiggle behavior, lordosis behavior, chase behavior, grooming behavior, sniffing genital area behavior, mount behavior, single trust behavior, intromission behavior, and ejaculate behavior.

49. The system of claim 35 wherein the computer program is configured to divide the arena into virtual zones.

50. The system of claim 35 wherein the first view objects and the second view objects include body parts.

51. The system of claim 35 wherein the behavior analysis module is further configured to determine the first living organism using information about the first living organism.

52. The system of claim 35 wherein the spatial relationship over time comprises spatial relationships between the first living organism and an inanimate object located within the arena.

53. The system of claim 37 wherein the spatial relationship over time comprises spatial relationships between body parts of the first living organism and the second living organism.

54. The system of claim 37 wherein the spatial relationship over time comprises spatial relationships between body parts of the first living organism and body parts of the second living organism.

55. The system of claim 37 wherein the spatial relationship over time comprises spatial relationships between the first living organism and an inanimate object determined from the first view objects and the second view objects.

56. The system of claim 35 wherein the spatial relationship over time comprises comprise spatial relationships between body parts of the first living organism and the second object, the second object being an inanimate object.

57. A computer-implemented method of identifying behaviors of living organisms comprising:
    acquiring at least a first view image of an arena from a first view over time and a second view image of the arena from a second view over time, the first view being different from the second view;
    identifying first view objects in the first view images;
    identifying second view objects in the second view images;
    determining a living organism and a second object from the first view objects and second view objects;
    performing stereo-view analysis to determine:
        a first spatial relationship between the living organism and the second object from the first view image of the arena from the first view; and
        a second spatial relationship for the first living organism and the second object from the second view image of the arena from the second view;
    determining spatial relationships over time between the first living organism and the second object based at least in part on the stereo-view analysis; and
    identifying behaviors that correspond to the spatial relationships over time of the between the first living organism and the second object.

58. The computer-implemented method of claim 57 wherein the first view and the second view are perpendicular to each other.

59. The system of claim 35 wherein the first view and the second view are perpendicular to each other.

60. The system of claim 1 wherein the first view and the second view are perpendicular to each other.

* * * * *